US011661125B2

(12) United States Patent
Kautsch

(10) Patent No.: US 11,661,125 B2
(45) Date of Patent: *May 30, 2023

(54) TRACK ASSEMBLY FOR TRACTION OF AN OFF-ROAD VEHICLE

(71) Applicant: Camso Inc., Magog (CA)

(72) Inventor: Dewaine Kautsch, Jefferson City, MO (US)

(73) Assignee: Camso Inc., Magog (CA)

( * ) Notice: Subject to any disclaimer, the term of this patent is extended or adjusted under 35 U.S.C. 154(b) by 977 days.

This patent is subject to a terminal disclaimer.

(21) Appl. No.: 16/523,053

(22) Filed: Jul. 26, 2019

(65) Prior Publication Data
US 2020/0055554 A1 Feb. 20, 2020

Related U.S. Application Data

(63) Continuation of application No. 16/143,784, filed on Sep. 27, 2018, now Pat. No. 10,399,619, which is a (Continued)

(51) Int. Cl.
*B62D 55/108* (2006.01)
*B62D 55/104* (2006.01)
*B62D 55/10* (2006.01)
*B62D 55/112* (2006.01)
*B62D 55/065* (2006.01)
(Continued)

(52) U.S. Cl.
CPC ......... *B62D 55/1086* (2013.01); *B62D 55/10* (2013.01); *B62D 55/104* (2013.01); *B62D 55/108* (2013.01); *B62D 55/112* (2013.01); *B62D 55/065* (2013.01); *B62D 55/12* (2013.01); *B62D 55/14* (2013.01)

(58) Field of Classification Search
CPC .. B62D 55/1086; B62D 55/10; B62D 55/104; B62D 55/108; B62D 55/112; B62D 55/065; B62D 55/12; B62D 55/14
See application file for complete search history.

(56) References Cited

U.S. PATENT DOCUMENTS 1,356,038 A 10/1920 Carey
1,368,652 A 2/1921 Pennington et al.
(Continued)

FOREIGN PATENT DOCUMENTS

CA 2899527 2/2017
WO 2011041704 4/2011
(Continued)

OTHER PUBLICATIONS

Advisory Action dated Jan. 16, 2009 in connection with U.S. Appl. No. 09/847,264, 2 pages.
(Continued)

*Primary Examiner* — Jacob D Knutson
*Assistant Examiner* — Abigail R Hymel
(74) *Attorney, Agent, or Firm* — Hahn Loeser & Parks LLP; Bret A. Hrivnak

(57) ABSTRACT

A track assembly for providing traction to an off-road vehicle, such as an agricultural vehicle, a construction vehicle, or another work vehicle, in which the track assembly may comprise a suspension between a frame of the track assembly and a bogie carrying roller wheels of the track assembly.

38 Claims, 32 Drawing Sheets

Related U.S. Application Data continuation of application No. 15/348,717, filed on Nov. 10, 2016, now Pat. No. 10,112,663, which is a continuation of application No. 13/495,823, filed on Jun. 13, 2012, now Pat. No. 9,505,454.

(60) Provisional application No. 61/496,114, filed on Jun. 13, 2011.

(51) Int. Cl.
*B62D 55/12* (2006.01)
*B62D 55/14* (2006.01)

(56) References Cited

U.S. PATENT DOCUMENTS

| | | |
|---|---|---|
| 1,439,236 A | 12/1922 | Harris |
| 1,451,627 A | 4/1923 | Munson |
| 1,488,080 A * | 3/1924 | Viale .................... B62D 55/108 305/132 |
| 1,539,582 A | 5/1925 | Landry |
| 1,585,100 A | 5/1926 | Kegresse |
| 1,636,828 A | 7/1927 | Neighbour |
| 1,665,470 A | 4/1928 | Norelius |
| 1,725,817 A | 8/1929 | Mitchell |
| 1,980,276 A | 11/1934 | Kegresse |
| 1,990,900 A | 2/1935 | Glasier |
| 2,052,068 A | 8/1936 | Ziegler |
| 2,345,158 A | 3/1944 | Schroter et al. |
| 2,442,354 A | 6/1948 | Gordon, Jr. et al. |
| 2,453,209 A | 11/1948 | Dwight |
| 2,467,947 A | 4/1949 | Skelton |
| 2,726,904 A | 12/1955 | Bekker |
| 2,749,189 A | 6/1956 | France et al. |
| 2,753,190 A | 7/1956 | Hooven |
| 3,170,532 A | 2/1965 | Boppart, Jr. |
| 3,216,520 A | 11/1965 | Blonsky |
| 3,275,386 A | 9/1966 | Bexten |
| 3,292,943 A | 12/1966 | Crockett |
| 3,333,867 A | 8/1967 | Schultze |
| 3,343,889 A | 9/1967 | Bexten |
| 3,346,306 A | 10/1967 | Siber |
| 3,357,751 A | 12/1967 | Brown |
| 3,412,820 A | 11/1968 | Wachholz |
| 3,435,908 A | 4/1969 | Sunderlin et al. |
| 3,455,405 A | 7/1969 | Parent |
| 3,506,079 A | 4/1970 | Madler et al. |
| 3,539,170 A | 11/1970 | Hamel |
| 3,556,455 A | 1/1971 | Storm et al. |
| 3,565,198 A | 2/1971 | Ames |
| 3,583,509 A | 6/1971 | Stachnik |
| 3,595,332 A | 7/1971 | Sanstrom |
| 3,613,810 A | 10/1971 | Hetteen et al. |
| 3,688,858 A | 9/1972 | Jespersen |
| 3,696,878 A | 10/1972 | Nelson |
| 3,774,708 A | 11/1973 | Purcell et al. |
| 3,826,325 A | 7/1974 | Purcell et al. |
| 3,828,873 A | 8/1974 | Oestmann |
| 3,828,874 A | 8/1974 | Council |
| 3,837,714 A | 9/1974 | Russ, Sr. |
| 3,841,424 A | 10/1974 | Purcell et al. |
| 3,860,079 A | 1/1975 | Hoffman |
| 3,889,769 A | 6/1975 | Blomstrom et al. |
| 3,946,822 A | 3/1976 | Dohse et al. |
| 3,948,110 A | 4/1976 | Lassanke |
| 3,951,483 A | 4/1976 | Nakamura |
| 4,019,268 A | 4/1977 | Waterman |
| 4,069,883 A | 1/1978 | Cosineau |
| 4,087,135 A | 5/1978 | Unruh |
| 4,161,227 A | 7/1979 | Inui et al. |
| 4,166,511 A | 9/1979 | Stedman |
| 4,230,199 A | 12/1980 | Stedman |
| 4,361,363 A * | 11/1982 | Livesay ............. B62D 55/108 474/134 |
| 4,420,272 A | 12/1983 | Ingalls et al. |
| 4,422,696 A | 12/1983 | Seit |
| 4,512,258 A | 4/1985 | Matsukata |
| 4,537,267 A | 8/1985 | Satzler |
| 4,583,791 A | 4/1986 | Nagata et al. |
| 4,647,116 A | 3/1987 | Trask |
| RE32,442 E | 6/1987 | Satzler |
| 4,681,177 A | 7/1987 | Zborowski |
| 4,781,257 A | 11/1988 | Gee et al. |
| 4,838,373 A | 6/1989 | Price et al. |
| 4,874,052 A | 10/1989 | Purcell et al. |
| 4,881,609 A | 11/1989 | Purcell et al. |
| 4,932,677 A | 6/1990 | Shustack |
| 4,936,639 A | 6/1990 | Pohjola |
| 4,940,002 A | 7/1990 | Bien |
| 4,966,242 A | 10/1990 | Baillargeon |
| 5,127,714 A | 7/1992 | Satzler |
| 5,168,632 A | 12/1992 | Rimlinger, Jr. |
| 5,184,842 A | 2/1993 | Stockton |
| 5,191,951 A | 3/1993 | Bargfrede et al. |
| 5,240,084 A | 8/1993 | Christianson |
| 5,273,126 A | 12/1993 | Reed et al. |
| 5,286,044 A | 2/1994 | Satzler et al. |
| 5,312,176 A | 5/1994 | Crabb |
| 5,316,381 A | 5/1994 | Isaacson et al. |
| 5,343,960 A | 9/1994 | Gilbert |
| 5,361,860 A | 11/1994 | Smith et al. |
| 5,373,909 A | 12/1994 | Dow et al. |
| 5,409,305 A | 4/1995 | Nagorcka |
| 5,451,135 A | 9/1995 | Schempf et al. |
| 5,452,949 A | 9/1995 | Kelderman |
| 5,494,125 A | 2/1996 | Gustin et al. |
| 5,531,282 A | 7/1996 | Jennen |
| 5,566,773 A | 10/1996 | Gersmann |
| 5,639,148 A | 6/1997 | Sheidler |
| 5,671,819 A | 9/1997 | Kendall |
| 5,769,512 A | 6/1998 | Kautsch |
| 5,829,848 A | 11/1998 | Kelderman |
| 5,842,757 A | 12/1998 | Kelderman |
| 5,899,542 A | 5/1999 | Lykken et al. |
| 5,899,543 A | 5/1999 | Lykken et al. |
| 5,924,503 A | 7/1999 | Lykken |
| 5,927,412 A | 7/1999 | Crabb |
| RE36,284 E | 8/1999 | Kelderman |
| 5,954,148 A | 9/1999 | Okumura et al. |
| 5,988,775 A | 11/1999 | Nordberg |
| D425,526 S | 5/2000 | Juncker et al. |
| 6,062,661 A | 5/2000 | Juncker et al. |
| 6,062,662 A | 5/2000 | Witt |
| 6,068,353 A | 5/2000 | Juncker et al. |
| 6,074,024 A | 6/2000 | Juncker |
| 6,074,025 A | 6/2000 | Juncker et al. |
| 6,116,362 A | 9/2000 | Schubert et al. |
| 6,125,956 A | 10/2000 | Gignac |
| 6,129,426 A | 10/2000 | Tucker |
| 6,131,833 A | 10/2000 | Chapman |
| 6,135,220 A | 10/2000 | Gleasman et al. |
| 6,164,399 A | 12/2000 | Bays |
| 6,176,334 B1 | 1/2001 | Lorenzen |
| 6,244,613 B1 | 6/2001 | Renger |
| 6,249,994 B1 | 6/2001 | Oertley |
| 6,267,459 B1 | 7/2001 | Becker et al. |
| 6,273,530 B1 | 8/2001 | Johnson et al. |
| 6,289,995 B1 | 9/2001 | Fuller |
| 6,218,484 B1 | 11/2001 | Lykken et al. |
| 6,318,484 B2 | 11/2001 | Lykken et al. |
| 6,374,933 B1 | 4/2002 | Ruppert, Jr. et al. |
| 6,386,653 B1 | 5/2002 | Brandenburger |
| 6,401,847 B1 | 6/2002 | Lykken |
| 6,502,840 B1 | 1/2003 | Leyonhjelm et al. |
| 6,536,854 B2 | 3/2003 | Juncker et al. |
| 6,543,861 B1 | 4/2003 | Kahle et al. |
| 6,543,862 B1 | 4/2003 | Kahle et al. |
| 6,557,953 B1 | 5/2003 | Kahle et al. |
| 6,604,796 B2 | 8/2003 | Boyum |
| 6,607,256 B2 | 8/2003 | Yoshida et al. |
| 6,640,915 B2 | 11/2003 | Haringer |
| 6,641,235 B2 | 11/2003 | Boyum |
| 6,712,549 B2 | 3/2004 | Roth |
| D488,171 S | 4/2004 | Juncker et al. |

(56) References Cited

U.S. PATENT DOCUMENTS

| | | | |
|---|---|---|---|
| 6,716,012 B2 | 4/2004 | Yovichin et al. | |
| 6,857,816 B2 | 2/2005 | Saito et al. | |
| 6,929,334 B2 | 7/2005 | Verheye et al. | |
| RE38,858 E | 11/2005 | Grawey et al. | |
| 6,959,936 B2 | 11/2005 | Anderson et al. | |
| 7,077,216 B2 | 7/2006 | Juncker | |
| 7,156,185 B2 | 1/2007 | Juncker | |
| 7,222,924 B2 | 5/2007 | Christianson | |
| 7,255,184 B2 | 8/2007 | Loegering et al. | |
| 7,370,918 B2 | 5/2008 | Tucker | |
| 7,380,892 B2 | 6/2008 | Rosenboom | |
| 7,552,979 B2 | 6/2009 | Christianson | |
| 7,740,084 B2 | 6/2010 | Rosenboom | |
| 7,798,260 B2 | 9/2010 | Albright | |
| 8,342,257 B2 | 1/2013 | Rosenboom | |
| 8,763,716 B2 | 7/2014 | Rosenboom | |
| 9,505,454 B1* | 11/2016 | Kautsch | B62D 55/108 |
| 9,580,121 B2 | 2/2017 | Reshad et al. | |
| 9,940,691 B2 | 4/2018 | Mitsunami et al. | |
| 9,988,108 B2 | 6/2018 | Tratta et al. | |
| 10,112,663 B1* | 10/2018 | Kautsch | B62D 55/108 |
| 10,259,512 B2 | 4/2019 | Rosemboom | |
| 10,399,619 B1* | 9/2019 | Kautsch | B62D 55/104 |
| 10,875,591 B2 | 12/2020 | Lunkenbein | |
| 11,077,897 B2 | 8/2021 | Tratta et al. | |
| 2001/0025732 A1 | 10/2001 | Lykken et al. | |
| 2002/0101052 A1 | 8/2002 | Panizzolo | |
| 2003/0070862 A1 | 4/2003 | Tartara | |
| 2003/0127258 A1 | 7/2003 | Lansberry | |
| 2005/0035650 A1 | 2/2005 | Toews | |
| 2005/0035655 A1 | 2/2005 | Beckstrom et al. | |
| 2005/0072607 A1 | 4/2005 | Tucker | |
| 2005/0077784 A1 | 4/2005 | Dudzinski et al. | |
| 2005/0200200 A1 | 9/2005 | Fukushima | |
| 2006/0113121 A1 | 6/2006 | Radke et al. | |
| 2006/0220456 A1 | 10/2006 | Sugahara | |
| 2006/0267405 A1 | 11/2006 | Tucker | |
| 2007/0046100 A1 | 3/2007 | McGilvrey et al. | |
| 2007/0102173 A1 | 5/2007 | Juncker | |
| 2007/0138866 A1 | 6/2007 | Rosenboom | |
| 2007/0261898 A1 | 11/2007 | Bessette | |
| 2008/0084111 A1 | 4/2008 | Rainer | |
| 2008/0156548 A1 | 7/2008 | Mallette et al. | |
| 2009/0105059 A1 | 4/2009 | Dorry et al. | |
| 2009/0194345 A1* | 8/2009 | Bessette | B62D 55/244 305/165 |
| 2009/0206655 A1 | 8/2009 | Song | |
| 2009/0278403 A1 | 11/2009 | Canossa | |
| 2009/0308669 A1 | 12/2009 | Vos et al. | |
| 2009/0321151 A1 | 12/2009 | Archambault et al. | |
| 2010/0006353 A1 | 1/2010 | Bernard et al. | |
| 2010/0012399 A1 | 1/2010 | Hansen | |
| 2010/0033010 A1 | 2/2010 | Shimozono | |
| 2010/0060075 A1 | 3/2010 | Hansen | |
| 2010/0071969 A1 | 3/2010 | Rainer | |
| 2010/0108421 A1 | 5/2010 | Zuchoski et al. | |
| 2010/0133019 A1 | 6/2010 | Muemken | |
| 2010/0139994 A1 | 6/2010 | Hansen | |
| 2010/0201186 A1 | 8/2010 | Rosenboom | |
| 2010/0295367 A1 | 11/2010 | Kim et al. | |
| 2011/0046832 A1 | 2/2011 | Francoeur | |
| 2011/0068620 A1 | 3/2011 | Delisle et al. | |
| 2011/0155482 A1 | 6/2011 | Courtemanche et al. | |
| 2012/0242142 A1 | 9/2012 | Kautsch et al. | |
| 2013/0126196 A1 | 5/2013 | Rosenboom | |
| 2013/0134772 A1 | 5/2013 | Dandurand et al. | |
| 2013/0187444 A1 | 7/2013 | Hansen | |
| 2014/0262563 A1 | 9/2014 | Rosenboom | |
| 2015/0344087 A1 | 12/2015 | De Boe et al. | |
| 2016/0039482 A1 | 2/2016 | Lussier et al. | |
| 2016/0059779 A1 | 3/2016 | Vandendriessche | |
| 2016/0114840 A1 | 4/2016 | L'Herault et al. | |
| 2016/0362148 A1 | 12/2016 | Rosenboom | |
| 2016/0362150 A1 | 12/2016 | Kirchmair et al. | |
| 2016/0362151 A1 | 12/2016 | Jee et al. | |
| 2017/0036714 A1 | 2/2017 | Lunkenbein | |
| 2017/0113742 A1 | 4/2017 | Tratta et al. | |
| 2017/0274946 A1 | 9/2017 | Vik et al. | |
| 2019/0002043 A1 | 1/2019 | Tratta et al. | |
| 2021/0001933 A1 | 1/2021 | Lunkenbein | |

FOREIGN PATENT DOCUMENTS

| | | |
|---|---|---|
| WO | 2014195386 A1 | 12/2014 |
| WO | 2021146817 | 7/2021 |

OTHER PUBLICATIONS

Advisory Action dated Jul. 16, 2009 in connection with U.S. Appl. No. 11/672,151, 5 pages.

Advisory Action dated Jul. 20, 2018 in connection with U.S. Appl. No. 15/228,007, 3 pages.

Ex Parte Quayle Action issued on Jan. 9, 2008 in connection with U.S. Appl. No. 10/776,086, 6 pages.

Examiner's Report dated Apr. 13, 2018 in connection with Canadian Patent Application No. 2,899,527, 5 pages.

Examiner's Report dated Jan. 2, 2018 in connection with Canadian Patent Application No. 2,899,527, 3 pages.

Final Office Action dated Apr. 13, 2009 in connection with U.S. Appl. No. 11/672,151, 8 pages.

Final Office Action dated Jul. 7, 2011 in connection with U.S. Appl. No. 12/708,062, 6 pages.

Final Office Action dated Jun. 23, 2008 in connection with U.S. Appl. No. 09/847,264, 13 pages.

Final Office Action dated Jun. 28, 2007 in connection with U.S. Appl. No. 09/847,264, 5 pages.

Final Office Action dated Jun. 4, 2007 in connection with U.S. Appl. No. 10/776,086, 6 pages.

Final Office Action dated Mar. 12, 2018 in connection with U.S. Appl. No. 15/246,704, 10 pages.

Final Office Action dated Mar. 14, 2018 in connection with U.S. Appl. No. 15/228,007, 14 pages.

Final Office Action dated Mar. 16, 2004 in connection with U.S. Appl. No. 09/847,264, 5 pages.

Final Office Action dated May 1, 2006 in connection with U.S. Appl. No. 09/847,264, 8 pages.

Final Office Action dated May 30, 2017 in connection with U.S. Appl. No. 15/246,704, 8 pages.

Notice of Allowance dated Jul. 25, 2016 in connection with U.S. Appl. No. 13/495,823, 5 pages.

Final Office Action dated Oct. 31, 2017 in connection with U.S. Appl. No. 15/246,704, 9 pages.

Notice of Allowance dated Jun. 27, 2018 in connection with U.S. Appl. No. 15/348,717, 9 pages.

Non-Final Office Action dated Aug. 1, 2005 in connection with U.S. Appl. No. 09/847,264, 5 pages.

Non-Final Office Action dated Dec. 13, 2006 in connection with U.S. Appl. No. 10/776,086, 6 pages.

Non-Final Office Action dated Dec. 19, 2007 in connection with U.S. Appl. No. 09/847,264, 11 pages.

Non-Final Office Action dated Jan. 16, 2015 in connection with U.S. Appl. No. 13/495,823, 12 pages.

Notice of Allowance dated Mar. 15, 2010 in connection with U.S. Appl. No. 09/847,264, 4 pages.

Non-Final Office Action dated Jan. 27, 2003 in connection with U.S. Appl. No. 09/847,264, 4 pages.

Non-Final Office Action dated Jul. 17, 2017 in connection with U.S. Appl. No. 15/228,007, 8 pages.

Non-Final Office Action dated Jul. 2, 2018 in connection with U.S. Appl. No. 15/246,704, 10 pages.

Non-Final Office Action dated Jul. 21, 2016 in connection with U.S. Appl. No. 13/499,655, 20 pages.

Non-Final Office Action dated Jul. 26, 2019 in connection with U.S. Appl. No. 15/228,007, 11 pages.

Non-Final Office Action dated May 22, 2006 in connection with U.S. Appl. No. 10/776,086, 5 pages.

Non-Final Office Action dated May 28, 2013 in connection with U.S. Appl. No. 13/707,515, 4 pages.

(56) References Cited

OTHER PUBLICATIONS

Non-Final Office Action dated Nov. 14, 2018 in connection with U.S. Appl. No. 16/143,784, 7 pages.
Non-Final Office Action dated Nov. 24, 2017 in connection with U.S. Appl. No. 15/246,704, 9 pages.
Non-Final Office Action dated Nov. 9, 2006 in connection with U.S. Appl. No. 09/847,264, 5 pages.
Non-Final Office Action dated Oct. 10, 2018 in connection with U.S. Appl. No. 15/228,007, 19 pages.
Non-Final Office Action dated Oct. 14, 2015 in connection with U.S. Appl. No. 14/287,794, 5 pages.
Non-Final Office Action dated Oct. 17, 2005 in connection with U.S. Appl. No. 10/776,086, 7 pages.
Non-Final Office Action dated Oct. 2, 2009 in connection with U.S. Appl. No. 09/847,264, 12 pages.
Non-Final Office Action dated Oct. 21, 2010 in connection with U.S. Appl. No. 12/708,062, 11 pages.
Non-Final Office Action dated Oct. 27, 2008 in connection with U.S. Appl. No. 11/672,151, 6 pages.
Non-Final Office Action dated Oct. 8, 2015 in connection with U.S. Appl. No. 13/495,823, 6 pages.
Non-Final Office Action dated Sep. 14, 2017 in connection with U.S. Appl. No. 15/246,704, 9 pages.
Non-Final Office Action dated Sep. 15, 2016 in connection with U.S. Appl. No. 15/246,704, 5 pages.
Notice of Allowance dated Apr. 17, 2019 in connection with U.S. Appl. No. 16/143,784, 10 pages.
Notice of Allowance dated Dec. 5, 2018 in connection with U.S. Appl. No. 15/246,704, 6 pages.
Notice of Allowance dated Feb. 19, 2014 in connection with U.S. Appl. No. 13/707,515, 5 pages.
Notice of Allowance dated Feb. 22, 2008 in connection with U.S. Appl. No. 10/776,086, 4 pages.
Notice of Allowance dated May 4, 2016 in connection with U.S. Appl. No. 14/287,794, 5 pages.
Notice of Allowance dated Nov. 16, 2009 in connection with U.S. Appl. No. 11/672,151, 7 pages.
Notice of Allowance dated Sep. 6, 2012 in connection with U.S. Appl. No. 12/708,062, 5 pages.
Restriction Requirement dated Aug. 9, 2002 in connection with U.S. Appl. No. 09/847,264, 4 pages.
Restriction Requirement dated Nov. 18, 2002 in connection with U.S. Appl. No. 09/847,264, 5 pages.
Examiner's Report dated Feb. 27, 2020 in connection with CA Patent Application No. 2,899,527, 3 pages.
Decision on Appeal issued on Apr. 15, 2019 in connection with U.S. Appl. No. 13/499,655, 11 pages.
Ex Parte Quayle Action issued on Nov. 22, 2017 in connection with U.S. Appl. No. 14/921,735, 5 pages.
Examiner answer to appeal brief issued on Jan. 18, 2018 in connection with U.S. Appl. No. 13/499,655, 28 pages.
Final Office Action dated Mar. 9, 2017 in connection with U.S. Appl. No. 13/499,655, 25 pages.
Notice of Allowance dated Jul. 22, 2019 in connection with U.S. Appl. No. 13/499,655, 18 pages.
Non-Final Office Action dated Jul. 21, 2017 in connection with U.S. Appl. No. 14/721,735, 7 pages.
Non-Final Office action dated Oct. 8, 2015 in connection with U.S. Appl. No. 13/495,823—12 pages.
Notice of allowance dated Feb. 8, 2018 in connection with U.S. Appl. No. 14/921,735, 7 pages.
Notice of Panel Decision from pre-appeal brief review issued on Jul. 13, 2017 in connection with U.S. Appl. No. 13/499,655, 2 pages.
Patent Board Decision issued on Apr. 15, 2019 in connection with U.S. Appl. No. 13/499,655, 11 pages.
Non-Final Office Action dated Aug. 25, 2020, in connection with U.S. Appl. No. 15/997,058, 39 pages.
Final Office Action dated Apr. 17, 2020 in connection with U.S. Appl. No. 15/228,007, 12 pages.
Notice of Allowance dated Aug. 24, 2020, in connection with U.S. Appl. No. 15/228,007, 6 pages.
Young, Lee W., "International Search Report", International Application No. PCT/US10/51166, dated Feb. 10, 2011 (4 pages).
Final Office Action issued by the United States Patent and Trademark Office dated Oct. 22, 2015 in connection with U.S. Appl. No. 13/499,655, 20 pages.
Non-Final Office action dated Jan. 16, 2015 in connection with U.S. Appl. No. 13/499,655, 19 pages.
Notice of Allowance dated Apr. 1, 2021 in connection with U.S. Appl. No. 15/977,058, 7 pages.
International Search Report and Written Opinion dated Apr. 16, 2021 in connection with International Patent application PCT/CA2021/050073, 11 pages.
Examiner's Report dated Oct. 4, 2021 in connection with CA Patent Application No. 3,002,278, 3 pages.

\* cited by examiner

TRACK ASSEMBLY FOR TRACTION OF AN OFF-ROAD VEHICLE

CROSS-REFERENCE TO RELATED APPLICATION

This application is a continuation of U.S. patent application Ser. No. 16/143,784, filed on Sep. 27, 2018; which is a continuation of U.S. patent application Ser. No. 15/348,717, filed Nov. 10, 2016, now U.S. Pat. No. 10,112,663; which is a continuation of U.S. patent application Ser. No. 13/495,823, filed Jun. 13, 2012, now U.S. Pat. No. 9,505,454, which claims priority from U.S. Provisional Patent Application 61/496,114 filed on Jun. 13, 2011, each application is hereby incorporated by reference herein.

FIELD OF THE INVENTION

The invention relates to track assemblies for traction of vehicles operable off-road.

BACKGROUND

Certain off-road vehicles, such as agricultural vehicles (e.g., harvesters, combines, tractors, etc.), construction vehicles (e.g., loaders, bulldozers, excavators, etc.), forestry vehicles (e.g., feller-bunchers, tree chippers, knuckleboom loaders, etc.) and military vehicles (e.g., combat engineering vehicles (CEVs), etc.) to name a few, are used in agricultural fields, construction sites and other areas with a variety of ground surfaces which may be soft, slippery and/or uneven (e.g., soil, mud, sand, ice, snow, etc.) to perform various types of work.

Some vehicles ride on tires that propel them on the ground. As they are typically quite heavy and their weight is distributed over a relatively small ground area by their tires, these vehicles apply relatively high pressure on the ground. This high pressure tends to compact the ground on which the vehicles are supported and such ground compaction can be undesirable (e.g., compacted soil can discourage crop growth or otherwise adversely affect the area being compacted). Also, as the tires provide a relatively small contact surface with the ground, traction of these vehicles is often limited, particularly on wet grounds.

To address these drawbacks, some vehicles have been provided with track assemblies instead of tire-equipped ground-engaging wheels. These track assemblies typically have elastomeric endless tracks which enhance floatation and traction of the vehicles on the ground. However, existing track assemblies tend to adversely affect other aspects of vehicle performance. For example, existing track assemblies often have no or poor shock or vibration absorption and/or have other characteristics that detrimentally affect ride quality.

For these and other reasons, there is a need to improve track systems for traction of off-road vehicles.

SUMMARY OF THE INVENTION

In accordance with an aspect of the invention, there is provided a track assembly for providing traction to an off-road vehicle. The track assembly has a longitudinal direction, a widthwise direction, and a height direction. The track assembly comprises a frame a plurality of track-contacting wheels, which includes a drive wheel and a plurality of roller wheels. The track assembly also comprises an endless track disposed around the track-contacting wheels. The endless track comprises an inner side facing the track-contacting wheels and a ground-engaging outer side for engaging the ground. The drive wheel engages the endless track to drive the endless track. The roller wheels are disposed to roll on a bottom run of the endless track. The track assembly comprises a bogie carrying at least two of the roller wheels. The track assembly also comprises a resilient device mounted between the frame and the bogie for allowing the bogie to move relative to the frame when the track assembly travels on an uneven ground area. The resilient device comprises a spring. The spring allows movement of the bogie relative to the frame in the height direction of the track assembly and allows movement of the bogie relative to the frame in a direction transversal to the height direction of the track assembly.

In accordance with another aspect of the invention, there is provided a track assembly for providing traction to an off-road vehicle. The track assembly comprises a frame a plurality of track-contacting wheels, which includes a drive wheel and a plurality of roller wheels. The track assembly also comprises an endless track disposed around the track-contacting wheels. The endless track comprises an inner side facing the track-contacting wheels and a ground-engaging outer side for engaging the ground. The drive wheel engages the endless track to drive the endless track. The roller wheels are disposed to roll on a bottom run of the endless track. The track assembly comprises a bogie carrying at least two of the roller wheels and pivotable relative to the frame about a pivot axis. The track assembly also comprises a resilient device mounted between the frame and the bogie for allowing the bogie to move relative to the frame when the track assembly travels on an uneven ground area. The resilient device comprises a spring. The spring allows a rotation of the bogie relative to the frame about an axis of rotation transversal to the pivot axis.

In accordance with another aspect of the invention, there is provided a track assembly for providing traction to an off-road vehicle. The track assembly comprises a frame a plurality of track-contacting wheels, which includes a drive wheel and a plurality of roller wheels. The track assembly also comprises an endless track disposed around the track-contacting wheels. The endless track comprises an inner side facing the track-contacting wheels and a ground-engaging outer side for engaging the ground. The drive wheel engages the endless track to drive the endless track. The roller wheels are disposed to roll on a bottom run of the endless track. The track assembly comprises a bogie carrying at least two of the roller wheels and pivotable relative to the frame about a pivot axis. The track assembly also comprises a tapered elastomeric spring mounted between the frame and the bogie for allowing the bogie to move relative to the frame when the track assembly travels on an uneven ground area.

In accordance with another aspect of the invention, there is provided a track assembly for providing traction to an off-road vehicle. The track assembly comprises a frame a plurality of track-contacting wheels, which includes a drive wheel and a plurality of roller wheels. The track assembly also comprises an endless track disposed around the track-contacting wheels. The endless track comprises an inner side facing the track-contacting wheels and a ground-engaging outer side for engaging the ground. The drive wheel engages the endless track to drive the endless track. The roller wheels are disposed to roll on a bottom run of the endless track. The track assembly comprises a bogie carrying at least two of the roller wheels and pivotable relative to the frame about a pivot axis. The frame enables the roller wheels to be mounted in a plurality of configurations. The plurality of configurations includes a suspension configuration in which the track assembly comprises: a bogie carrying at least two of the roller wheels and pivotable relative to the frame about a pivot axis; and a resilient device mounted between the frame and the bogie for allowing the bogie to move relative to the frame when the track assembly travels on an uneven ground area, the resilient device comprising a spring. The plurality of configurations also includes a suspension-less configuration in which the track assembly: comprises a bogie carrying at least two of the roller wheels and pivotable relative to the frame about a pivot axis; and is free of any spring mounted between the frame and the bogie for allowing the bogie to move relative to the frame when the track assembly travels on an uneven ground area. The plurality of configurations alos includes a bogie-less configuration in which the track assembly is free of any bogie carrying at least two of the roller wheels and pivotable relative to the frame about a pivot axis.

In accordance with another aspect of the invention, there is provided a tracked vehicle comprising a plurality of track assemblies. The plurality of track assemblies includes a first track assembly in a front of the tracked vehicle, a second track assembly in the front of the tracked vehicle, a third track assembly in a rear of the tracked vehicle, and a fourth track assembly in the rear of the tracked vehicle. Each track assembly of the plurality of track assemblies comprises: a frame; a plurality of track-contacting wheels which includes a drive wheel and a plurality of roller wheels; and an endless track disposed around the track-contacting wheels, the endless track comprising an inner side facing the track-contacting wheels and a ground-engaging outer side for engaging the ground, the drive wheel engaging the endless track to drive the endless track, the roller wheels being disposed to roll on a bottom run of the endless track. A first one of the track assemblies comprises: a bogie carrying at least two of the roller wheels of the first one of the track assemblies and pivotable relative to the frame of the first one of the track assemblies about a pivot axis; and a resilient device mounted between the frame of the first one of the track assemblies and the bogie of the first one of the track assemblies for allowing the bogie of the first one of the track assemblies to move relative to the frame of the first one of the track assemblies when the first one of the track assemblies travels on an uneven ground area, the resilient device comprising a spring. A second one of the track assemblies is free of any spring mounted between the frame of the second one of the track assemblies and the roller wheels of the second one of the track assemblies.

These and other aspects of the invention will now become apparent to those of ordinary skill in the art upon review of the following description of embodiments of the invention in conjunction with the accompanying drawings.

BRIEF DESCRIPTION OF THE DRAWINGS

A detailed description of embodiments of the invention is provided below, by way of example only, with reference to the accompanying drawings, in which.

It is to be expressly understood that the description and drawings are only for the purpose of illustrating certain embodiments of the invention and are an aid for understanding. They are not intended to be a definition of the limits of the invention.

DETAILED DESCRIPTION OF EMBODIMENTS

Figure 1:
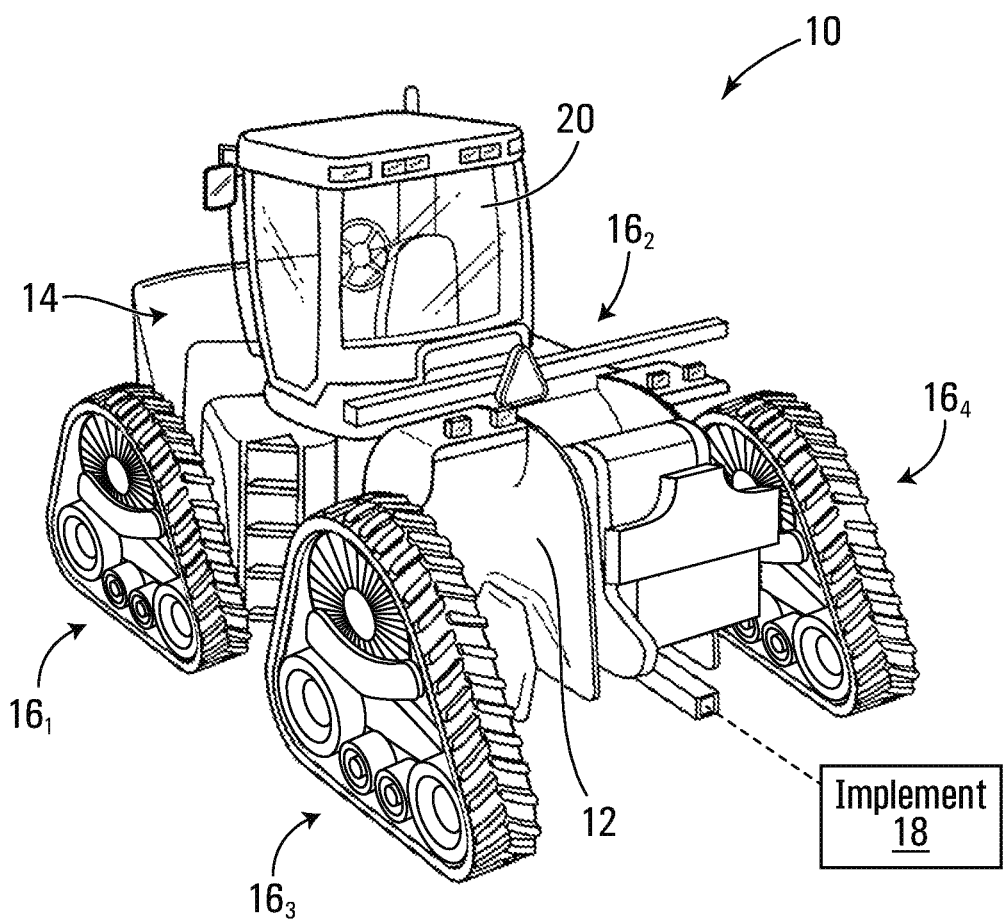
FIG. 1 shows an example of an off-road vehicle comprising track assemblies in accordance with an embodiment of the invention.
Figure 2:
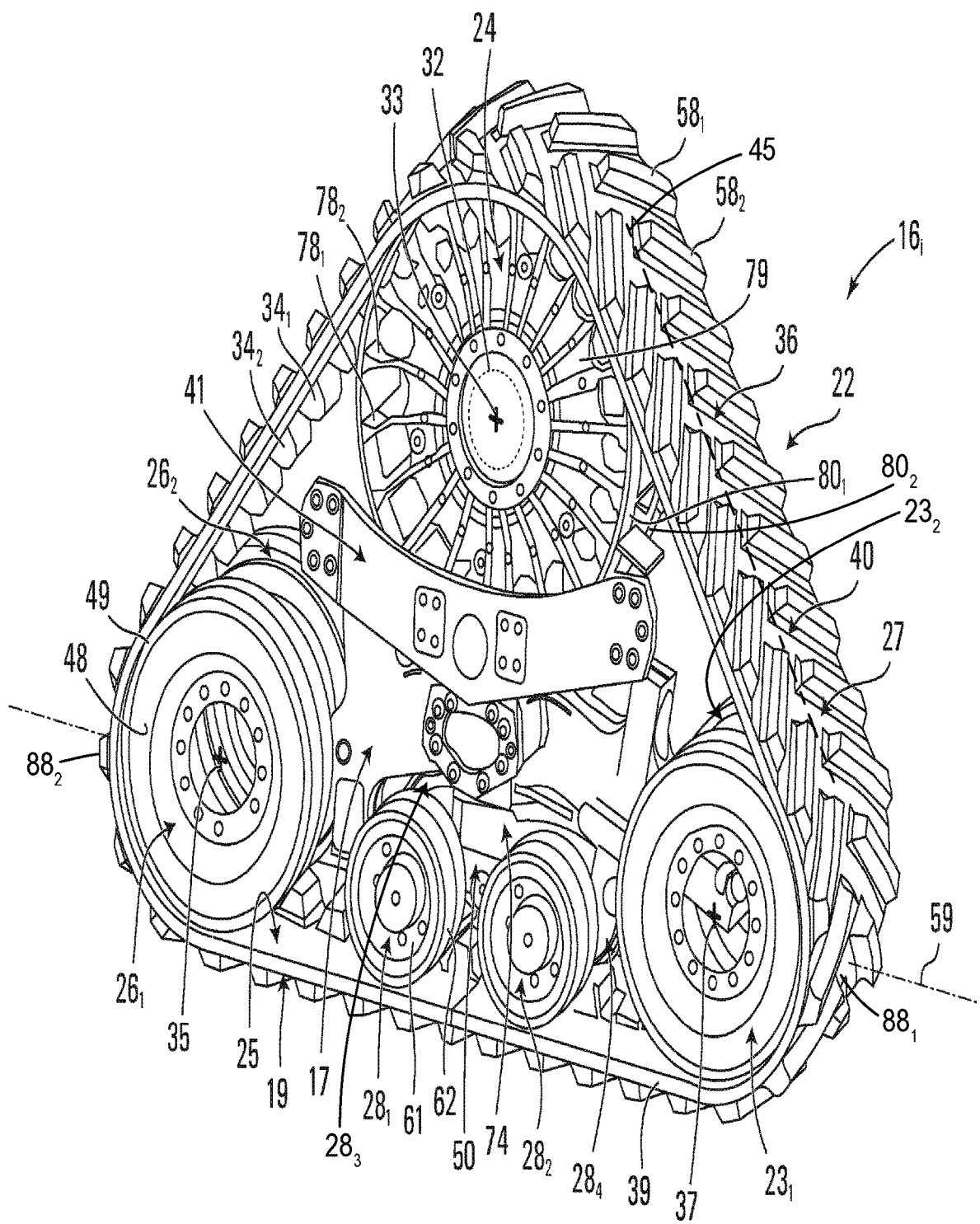
FIG. 2 shows a track assembly of the vehicle.
Figure 3:
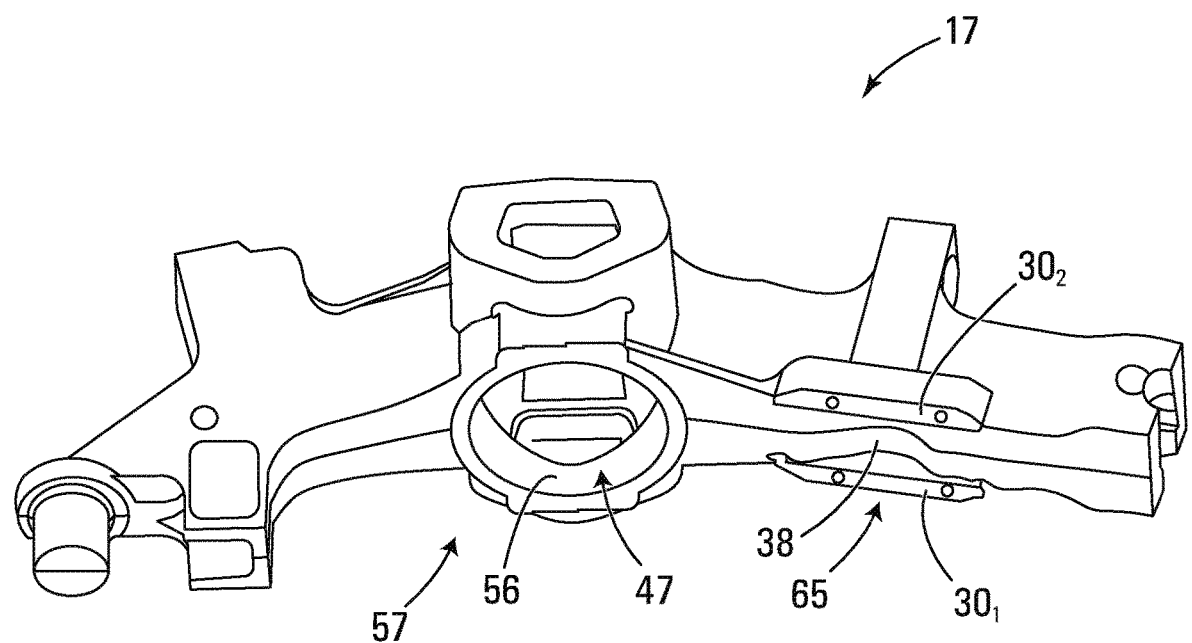
FIG. 3 shows a frame of the track assembly.
Figure 4:
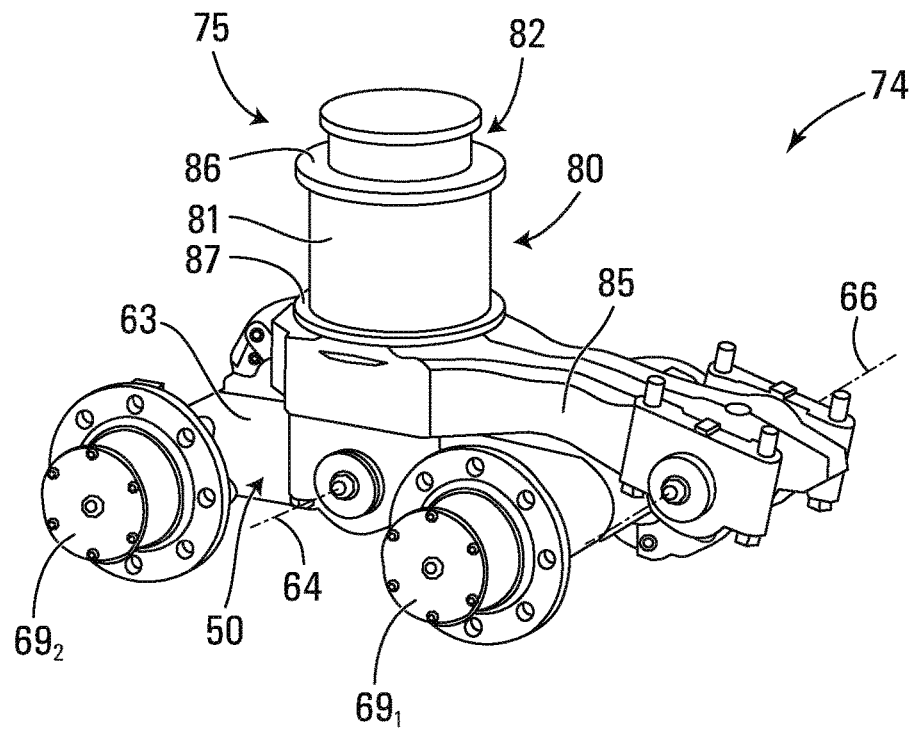
FIG. 4 shows a suspension and a bogie of the track assembly.
Figure 5:
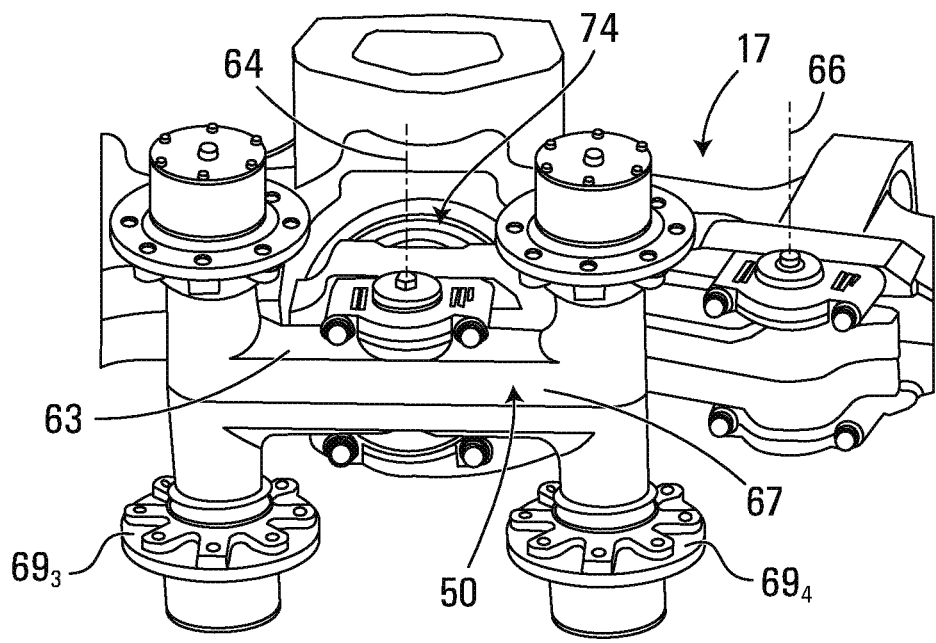
FIGS. 5 and 6 show the frame, the suspension, and the bogie.
Figure 6:
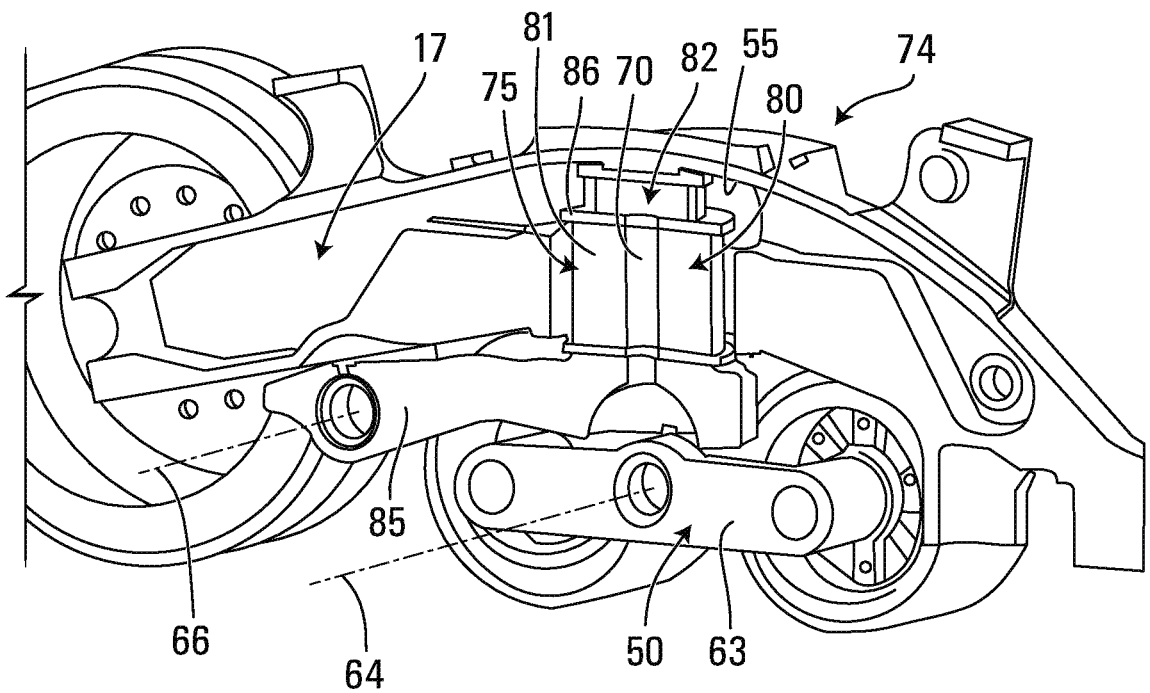
Figure 7:
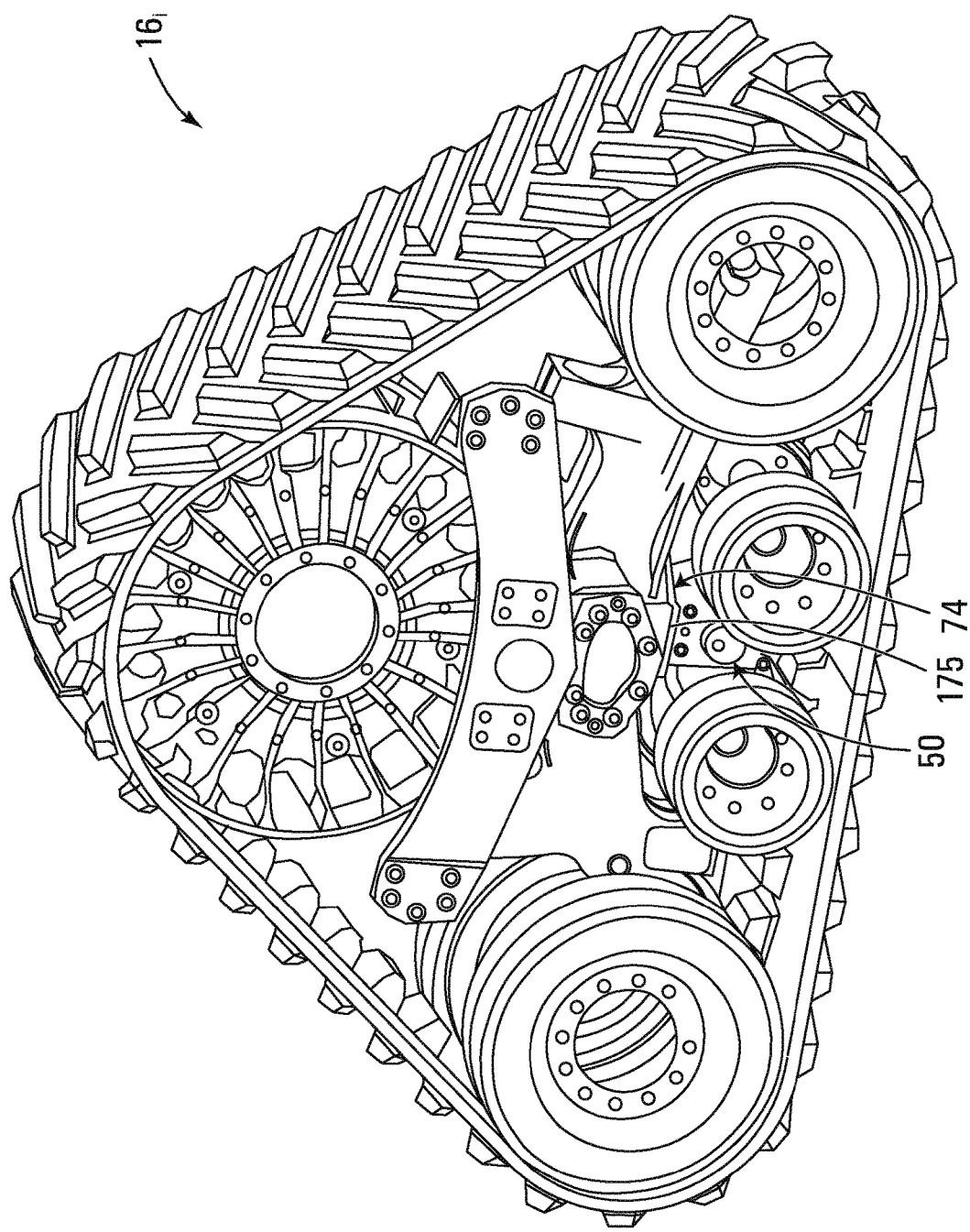
FIG. 7 shows a variant of the track assembly.
Figure 8:
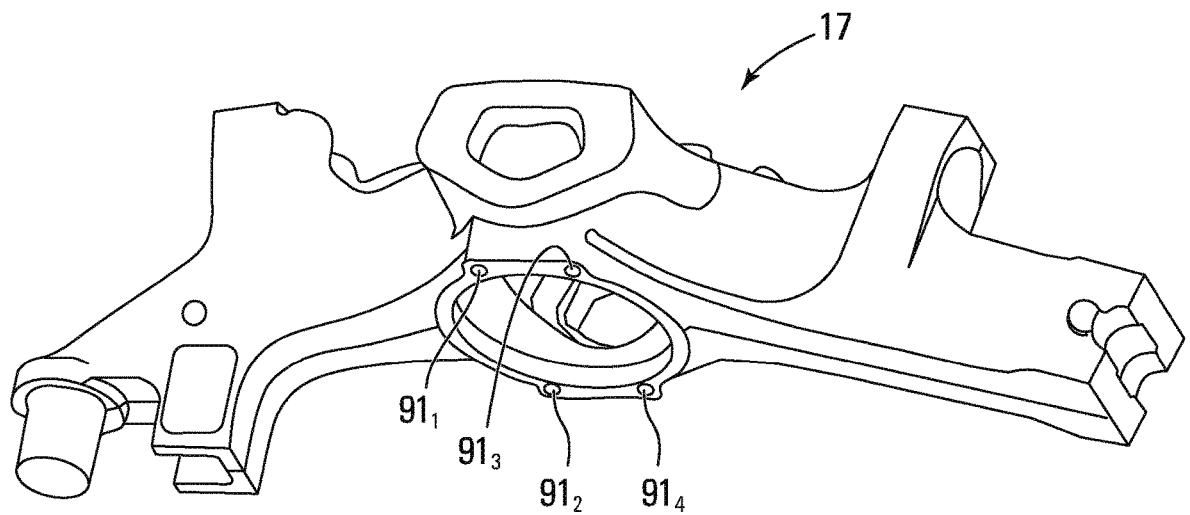
FIG. 8 shows a variant of the frame for the track assembly of FIG. 7.

FIG. 1 shows an example of an off-road tracked vehicle 10 in accordance with an embodiment of the invention. In this embodiment, the vehicle 10 is a heavy-duty work vehicle for performing agricultural, construction or other industrial work or military work. More particularly, in this embodiment, the vehicle 10 is an agricultural vehicle for performing agricultural work. More specifically, in this example, the agricultural vehicle 10 is a tractor. In other examples, the agricultural vehicle 10 may be a combine harvester, another type of harvester, or any other type of agricultural vehicle.

The agricultural vehicle 10 comprises a frame 12 supporting a prime mover 14, a plurality of track assemblies $16_1$-$16_4$ (which can be referred to as "undercarriages"), a working implement 18, and an operator cabin 20, which enable an operator to move the agricultural vehicle 10 on the ground to perform agricultural work.

The prime mover 14 generates motive power to move the agricultural vehicle 10. For example, the prime mover 14 may comprise an internal combustion engine and/or one or more other types of motors (e.g., an electric motor) for generating motive power to move the agricultural vehicle 10. The prime mover 14 is in a driving relationship with each of the track assemblies $16_1$-$16_4$. That is, power derived from the prime mover 14 is transmitted to each of the track assemblies $16_1$-$16_4$ via a powertrain of the agricultural vehicle 10 in order to drive the track assemblies $16_1$-$16_4$.

The working implement 18 is used to perform agricultural work. For example, in various embodiments, the working implement 18 may include a combine head to cut and/or otherwise process crops, a cutter, a scraper, a tiller or any other type of agricultural working implement.

The operator cabin 20 is where the operator sits and controls the agricultural vehicle 10. More particularly, the operator cabin 20 comprises a set of controls that allow the operator to steer the agricultural vehicle 10 on the ground, operate the working implement 18 and control other aspects of the vehicle 10.

The track assemblies $16_1$-$16_4$ engage the ground to propel the agricultural vehicle 10 on the ground.

With additional reference to FIGS. 2 to 6, in this embodiment, each track assembly $16_i$ comprises: a frame 17; a plurality of track-contacting wheels, including a driver wheel 24 and a plurality of idler wheels, which includes front (i.e., leading) idler wheels $23_1$, $23_2$, rear (i.e., trailing) idler wheels $26_1$, $26_2$, and roller wheels $28_1$-$28_4$; and an endless track 22 disposed around these wheels. The driver wheel 24 is rotatable by power derived from the prime mover 14 to impart motion to the endless track 22 in order to propel the agricultural vehicle 10 on the ground. The idler wheels $23_1$, $23_2$, $26_1$, $26_2$, $28_1$-$28_4$ do not convert power derived from the prime mover 14 to motive force, but are rather used to do at least one of supporting part of the weight of the agricultural vehicle 10 on the ground via the endless track 22, guiding the endless track 22 as it is driven by the driver wheel 24, and tensioning the endless track 22. As it is driven by the driver wheel 24, the endless track 22 engages the ground for traction.

The track assembly $16_i$ has a longitudinal axis 59 (i.e., an axis generally parallel to a longitudinal axis of the agricultural vehicle 10) that defines a longitudinal direction of the track assembly $16_i$ (i.e., a direction generally parallel to the longitudinal axis 59) and transversal directions of the track assembly $16_i$ (i.e., directions transverse to the longitudinal axis 59), including a widthwise direction of the track assembly $16_i$ (i.e., a lateral direction generally perpendicular to the longitudinal axis 59). A height direction of the track assembly $16_i$ is perpendicular to both the longitudinal direction of the track assembly $16_i$ and the widthwise direction of the track assembly $16_i$. When the vehicle 10 is on a horizontal ground surface, the height direction of the track assembly $16_i$ is thus a vertical direction. The track assembly $16_i$ has a length, a width, and a height.

The track assembly $16_i$ is connected to an axle 32 of the agricultural vehicle 10. In this case, the axle 32 is a driven axle that is rotated by power derived from the prime mover 14 and delivered via the powertrain of the vehicle 10. More particularly, in this embodiment, the driver wheel 24 is mounted to the axle 32 of the agricultural vehicle 10.

In some embodiments, the agricultural vehicle 10 may have been designed and manufactured as a tracked vehicle with the track assemblies $16_1$-$16_4$ already provided thereon.

Figure 38:
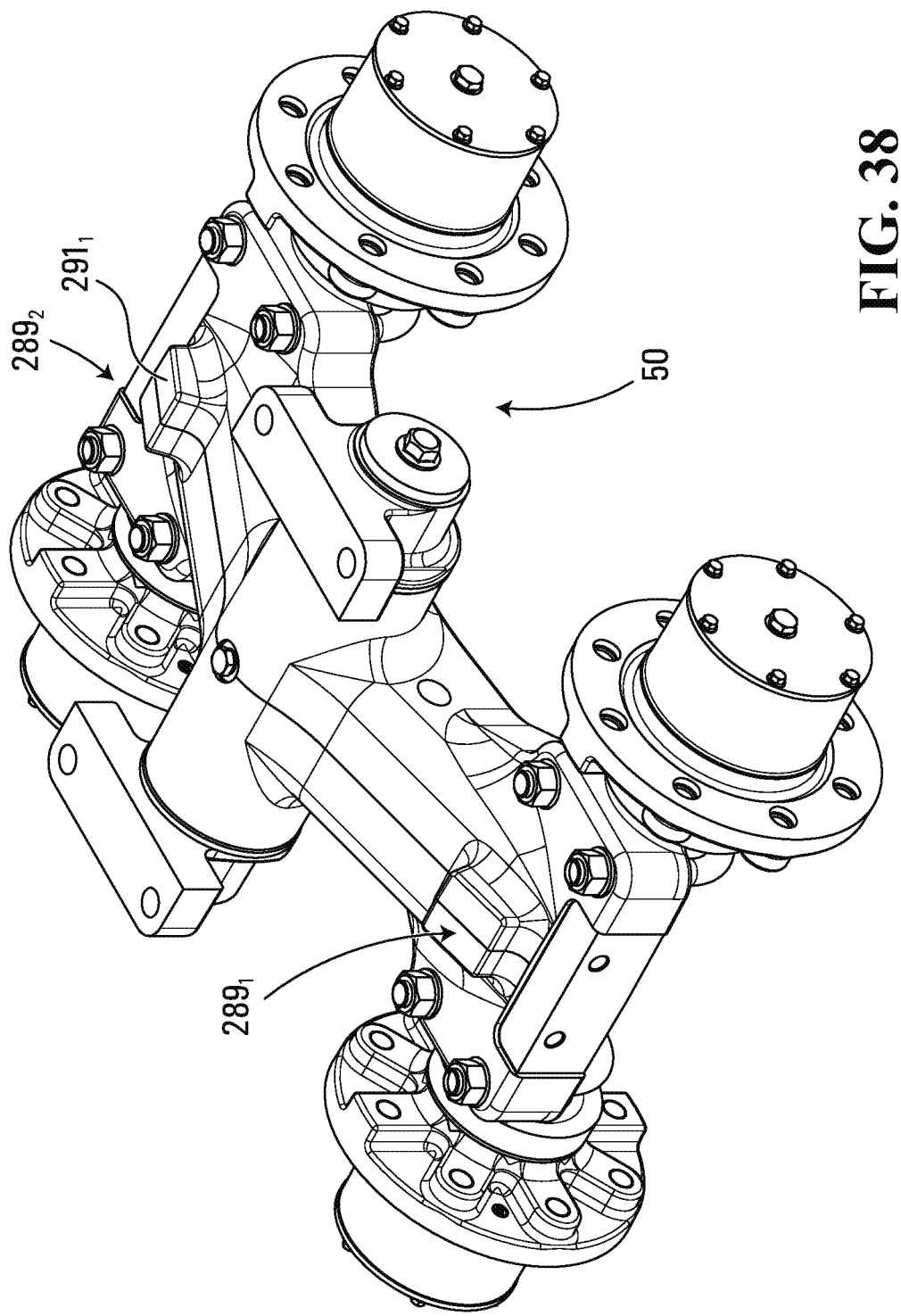
Figure 39:
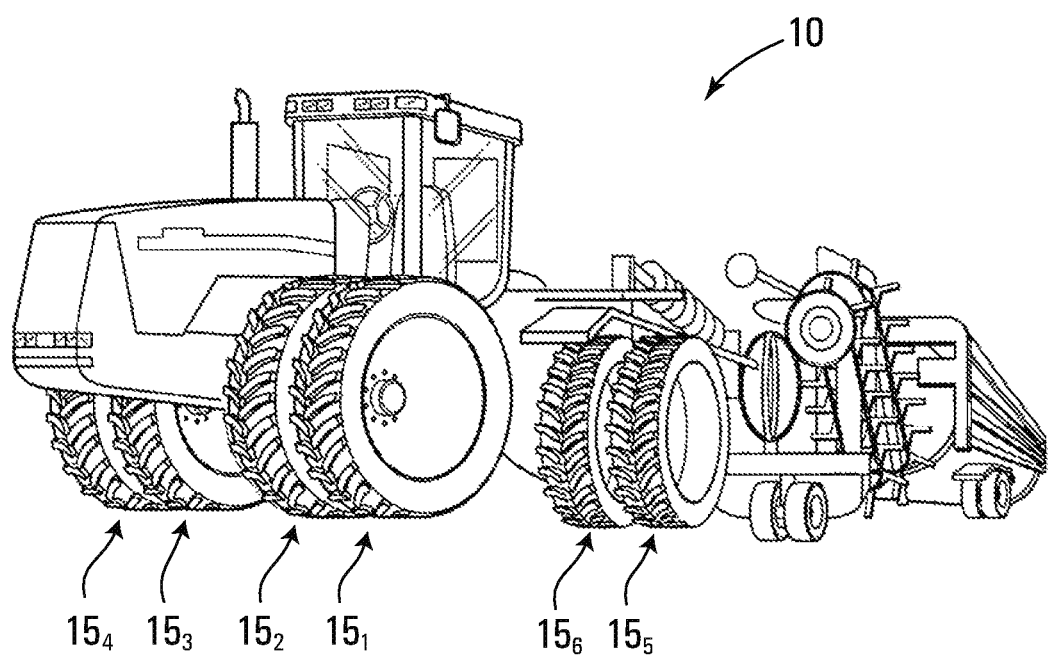
FIG. 39 shows the off-road vehicle provided with tire-equipped ground-engaging wheels instead of the track assemblies.

In other embodiments, as shown in FIG. 38, the agricultural vehicle 10 may have been designed and manufactured as a wheeled vehicle propelled on the ground by ground-engaging wheels $15_1$-$15_6$ and the track assemblies $16_1$-$16_4$ may be used to convert the agricultural vehicle 10 from the wheeled vehicle into a tracked vehicle, thereby enhancing its traction and floatation on the ground. Each ground-engaging wheel $15_1$, $15_2$, $15_3$, $15_4$, $15_5$ or $15_6$ is mounted to the axle 32 of the agricultural vehicle 10 and comprises a tire, which may be pneumatic or solid and made of rubber and/or other materials (e.g., agricultural or off-the-road (OTR) tires). In such embodiments, the dimensions of the track assembly $16_i$ may allow it to be mounted in place of a ground-engaging wheel $15_1$, $15_2$, $15_3$, $15_4$, $15_5$ or $15_6$ by removing the ground-engaging wheel $15_1$, $15_2$, $15_3$, $15_4$, $15_5$ or $15_6$ and installing the track assembly $16_i$ in its place.

The endless track 22 engages the ground to provide traction to the agricultural vehicle 10. More specifically, the endless track 22 comprises an inner side 25 and a ground-engaging outer side 27. The inner side 25 faces the wheels 24, $23_1$, $23_2$, $26_1$, $26_2$, $28_1$-$28_4$ and defines an inner space of the track assembly $16_i$ in which these wheels rotate. The ground-engaging outer side 27 engages the ground for traction of the agricultural vehicle 10. The endless track 22 has a longitudinal axis 45 defining a longitudinal direction of the endless track 22 (i.e., a direction generally parallel to the longitudinal axis 45) and transversal directions of the endless track 22 (i.e., directions transverse to the longitudinal axis 45), including a widthwise direction of the endless track 22 (i.e., a lateral direction generally perpendicular to the longitudinal axis 45). A thickness direction of the endless track 22 is perpendicular to both the longitudinal direction of the track 22 and the widthwise direction of the track 22. The endless track 22 comprises an upper run 36 which extends from a front longitudinal end $88_1$ of the track assembly $16_i$ to a rear longitudinal end $88_2$ of the track assembly $16_i$ and above the drive wheel 24, and a lower run 19 which extends from the front longitudinal end $88_1$ of the track assembly $16_i$ to the rear longitudinal end $88_2$ of the track assembly $16_i$ and under the idler wheels $23_1$, $23_2$, $26_1$, $26_2$, $28_1$-$28_4$.

In this embodiment, the endless track 22 is an elastomeric endless track. The track 22 is elastomeric in that it comprises elastomeric material allowing it to elastically change in shape as it is in motion around the wheels 24, $23_1$, $23_2$, $26_1$, $26_2$, $28_1$-$28_4$. The elastomeric material of the track 22 can include any polymeric material with suitable elasticity. In this example, the elastomeric material of the track 22 includes rubber. Various rubber compounds may be used and, in some cases, different rubber compounds may be present in different areas of the track 22. In other examples, the elastomeric material of the track 22 may include another elastomer in addition to or instead of rubber (e.g., polyurethane elastomer).

More particularly, in this embodiment, the endless track 22 comprises an elastomeric belt-shaped body 39 underlying its inner side 25 and its ground-engaging outer side 27 and allowing the endless track 22 to elastically change in shape as it is in motion around the wheels 24, $23_1$, $23_2$, $26_1$, $26_2$, $28_1$-$28_4$. In view of its underlying nature, the elastomeric belt-shaped body 39 can be referred to as a "carcass". The carcass 39 comprises elastomeric material. Also, in this embodiment, the carcass 39 comprises one or more reinforcements embedded in its elastomeric material. For example, one such reinforcement may be a layer of reinforcing cables (e.g., cords or wire ropes) that extend generally in the longitudinal direction of the endless track 22 to enhance its strength in tension along its longitudinal direction. Another example of a reinforcement is a layer of reinforcing fabric that comprises pliable material made usually by weaving, felting, or knitting natural or synthetic fibers (e.g., a ply of reinforcing woven fibers).

The ground-engaging outer side 27 of the endless track 22 comprises a tread pattern 40 to enhance traction on the ground. The tread pattern 40 comprises a plurality of traction projections $58_1$-$58_T$ (sometimes referred to as "traction lugs", "tread members" or "tread bars") distributed on the ground-engaging outer side 27. In this embodiment, each of the traction projections $58_1$-$58_T$ has an elongated shape and is angled relative to the longitudinal direction of the endless track 22. The traction projections $58_1$-$58_T$ may have various other shapes in other examples (e.g., curved shapes, shapes with straight parts and curved parts, etc.). In this case, each traction projection $58_i$ is an elastomeric traction projection that comprises elastomeric material.

The inner side 25 of the endless track 22 comprises a plurality of wheel-contacting projections $34_1$-$34_N$ that are positioned to contact at least some of the wheels 24, $23_1$, $23_2$, $26_1$, $26_2$, $28_1$-$28_4$ to do at least one of driving (i.e., imparting motion to) the track 22 and guiding the track 22. The wheel-contacting projections $34_1$-$34_N$ can be referred to as "wheel-contacting lugs". Furthermore, since each of them is used to do at least one of driving the track 22 and guiding the track 22, the wheel-contacting lugs $34_1$-$34_N$ can be referred to as "drive/guide projections" or "drive/guide lugs".

In this embodiment, each drive/guide lug $34_i$ interacts with the drive wheel 24 to drive the track 22 and interacts with the idler wheels $23_1$, $23_2$, $26_1$, $26_2$, $28_1$-$28_4$ to guide the track 22 to maintain proper track alignment and prevent de-tracking. The drive/guide lug $34_i$ is thus both a drive lug and a guide lug. In other embodiments, a drive/guide lug $34_i$ may interact with the idler wheels $23_1$, $23_2$, $26_1$, $26_2$, $28_1$-$28_4$ to guide the track 22 to maintain proper track alignment and prevent de-tracking without being used to drive the track 22, in which case the drive/guide lug $34_i$ is a guide lug. In other embodiments, a drive/guide lug $34_i$ may interact with the drive wheel 24 to drive the track 22 without interacting with the idler wheels $23_1$, $23_2$, $26_1$, $26_2$, $28_1$-$28_4$. In this case, each drive/guide lug $34_i$ is an elastomeric drive/guide lug that comprises elastomeric material.

The drive/guide lugs $34_1$-$34_N$ are spaced apart in the longitudinal direction of the endless track 22. In this case, the drive/guide lugs $34_1$-$34_N$ are arranged in a single row. The drive/guide lugs $34_1$-$34_N$ may be arranged in other manners in other embodiments (e.g., in a plurality of rows that are spaced apart in the widthwise direction of the track 22).

The drive wheel 24 is rotatable by power derived from the prime mover 14 to impart motion to the endless track 22. The drive wheel 24 thus rotates when the axle 32 of the agricultural vehicle 10 rotates. More particularly, in this embodiment, the drive wheel 24 is mounted to the axle 32 of the agricultural vehicle 10. The drive wheel 24 has an axis of rotation 33 which is defined by the axle 32 of the agricultural vehicle 10. In this example of implementation, an axis of rotation of the axle 32, which in this case corresponds to the axis of rotation 33 of the drive wheel 24, is located between respective axes of rotation 37, 35 of the front idler wheels $23_1$, $23_2$ and the rear idler wheels $26_1$, $26_2$ in the longitudinal direction of the track assembly $16_i$. The drive wheel 24 contacts the upper run 36 of the endless track 22 and is spaced apart from the lower run 19 of the endless track 22 in the height direction of the track assembly $16_i$.

More particularly, in this embodiment, the drive wheel 24 is a drive sprocket engaging the drive/guide lugs $34_1$-$34_N$ of the endless track 22 in order to drive the track 22. The drive wheel 24 and the track 22 thus implement a "positive drive" system. The drive wheel 24 comprises a plurality of drive members $78_1$-$78_B$ which are circumferentially spaced apart from one another. In this case, the drive members $78_1$-$78_B$ extend radially between a hub 79 of the drive wheel 24 and a pair of annular member $80_1$, $80_2$ at a circumference of the drive wheel 24. The drive wheel 24 and the track 22 have respective dimensions allowing interlocking of the drive members $78_1$-$78_B$ of the drive wheel 24 and the drive/guide lugs $34_1$-$34_N$ of the track 22. Adjacent ones of the drive members $78_1$-$78_B$ define a space between them to receive one of the drive/guide lugs $34_1$-$34_N$. Adjacent ones of the drive/guide lugs $34_1$-$34_N$ define a space between them to receive one of the drive members $78_1$-$78_B$.

The drive wheel 24 may be configured in various other ways in other embodiments. For example, in embodiments where the endless track 22 comprises recesses or holes, the drive wheel 24 may have teeth that enter these recesses or holes in order to drive the track 22. As another example, in some embodiments, the drive wheel 24 may frictionally engage the inner side 25 of the track 22 in order to frictionally drive the track 22, i.e., the drive wheel 24 and the track 22 may implement a "friction drive" system.

The front idler wheels $23_1$, $23_2$ and the rear idler wheels $26_1$, $26_2$ can support part of the weight of the agricultural vehicle 10 via the endless track 22 and guide the endless track 22 and maintain it under tension as it is driven by the drive wheel 24. In this embodiment, each of the idler wheels $23_1$, $23_2$, $26_1$, $26_2$ comprises a wheel body 48 made of rigid material (e.g., steel or other metal) and a peripheral portion 49 made of elastomeric material (e.g., rubber) that enhances its grip on the inner side 25 of the endless track 22. The front idler wheels $23_1$, $23_2$ are rotatable about an axle and the rear idler wheels $23_1$, $23_2$ are rotatable about an axle. In other embodiments, each of the idler wheels $23_1$, $23_2$, $26_1$, $26_2$ may be rotatable about a different axle and/or constructed in various other manners and/or using various other materials.

The front idler wheels $23_1$, $23_2$ are spaced apart from one another in the widthwise direction of the track assembly $16_i$ to define a space therebetween. Similarly, the rear idler wheels $26_1$, $26_2$ are spaced apart from one another in the widthwise direction of the track assembly $16_i$ to define a space therebetween. As the endless track 22 is in motion, its drive/guide lugs $34_1$-$34_N$ pass in the space between the front idler wheels $23_1$, $23_2$ and in the space between the rear idler wheels $26_1$, $26_2$ and, by being so constrained, help to guide the motion of the endless track 22 to prevent undesired lateral movement or detracking of the track 22.

The roller wheels $28_1$-$28_4$ roll on the lower run 19 of the endless track 22 to apply it on the ground for traction and guide the track 22 as it is driven by the drive wheel 24. Since they are located between the front idler wheels $23_1$, $23_2$ and the rear idler wheels $26_1$, $26_2$ in the longitudinal direction of the track assembly $16_i$, the roller wheels $28_1$-$28_4$ can be referred to as "mid-rollers". In this embodiment, each of the mid-rollers $28_1$-$28_4$ comprises a wheel body 61 made of rigid material (e.g., steel or other metal) and a peripheral portion 62 made of elastomeric material (e.g., rubber) that enhances its grip on the inner side 25 of the endless track 22. The mid-rollers $28_1$-$28_4$ may be constructed in various other manners and/or using various other materials in other embodiments.

In this embodiment, the mid-rollers $28_1$-$28_4$ are carried by a bogie 50 of the track assembly $16_i$. The bogie 50 is a wheel-carrying assembly that comprises a wheel-carrying structure 63 to which are mounted the mid-rollers $28_1$-$28_4$. The wheel-carrying structure 63 is movable relative to the frame 17. More particularly, in this embodiment, the wheel-carrying structure 63 is pivotable relative to the frame 17 about a pivot 42 defining a pivot axis 64. This allows the mid-rollers $28_1$-$28_4$ to move up and down as a "tandem" when the wheel-carrying structure 63 pivots about the pivot axis 64 to conform to a ground unevenness, such as a terrain variation (i.e., a terrain elevation or depression such as a hill or bump) and/or an object (e.g., a rock) on the ground. In other words, the pivot axis 64 constitutes a pitch axis for pitching of the bogie 50.

More particularly, in this example of implementation, the wheel-carrying structure 63 comprises an elongated portion 67 extending in the longitudinal direction of the track assembly $16_i$ and through which extends the pivot axis 64. The wheel-carrying structure 63 also comprises wheel mounts $69_1$-$69_4$ supporting respective axles of the mid-rollers $28_1$-$28_4$. The wheel-carrying structure 63 may be configured in various other ways in other examples of implementation.

In this embodiment, the track assembly $16_i$ comprises a tensioning system for maintaining the endless track 22 in tension. In this example, the tensioning system is connected between the frame 17 and the front idler wheels $23_1$, $23_2$ to urge the front idler wheels $23_1$, $23_2$ in a direction to maintain the endless track 22 in tension. More particularly, in this embodiment, the tensioning system is a fluidic tensioning system, i.e., a tensioning system using a fluid such as a hydraulic or pneumatic tensioning system, which comprises a piston-cylinder arrangement connected to a fluid reservoir (e.g., a hydraulic piston-cylinder arrangement connected to a hydraulic accumulator). The piston-cylinder arrangement has a first end portion connected to the frame 17 and a second end portion connected to a link mounted to the axle of the front idler wheels $23_1$, $23_2$.

In addition to its drive wheel 24 being connected to the axle 32 of the agricultural vehicle 10, in this embodiment, the track assembly $16_i$ is connected to a fixed structure of the vehicle 10. The fixed structure may be the frame 12 of the vehicle 10 or a structure fixed on the frame 12 of the vehicle 10. More particularly, in this embodiment, the track assembly $16_i$ comprises a mounting structure 41 interconnecting the frame 17 of the track assembly $16_i$ to a housing of the axle 32 of the vehicle 10 that is fixed to the frame 12 of the vehicle 10.

The track assembly $16_i$ comprises a suspension 74 for absorbing shocks, reducing vibrations, and/or improving ride quality. In this embodiment, the suspension 74 comprises a resilient device 75 mounted between the frame 17 and the mid-rollers $28_1$-$28_4$. The resilient device 75 is configured to change from a first configuration to a second configuration in response to a load and recover the first configuration in response to removal of the load to allow movement of the mid-rollers $28_1$-$28_4$ relative to the frame 17.

More particularly, in this example of implementation, the resilient device 75 is mounted between the frame 17 and the bogie 50 carrying the mid-rollers $28_1$-$28_4$ to allow movement of the bogie 50 relative to the frame 17. In this example, the resilient device 75 allows movement of the bogie 50 relative to the frame 17 in the height direction of the track assembly $16_i$. Thus, when the vehicle 10 is on a horizontal ground surface, the resilient device 75 allows vertical movement of the bogie 50 relative to the frame 17.

The resilient device 75 comprises a spring 80. The spring 80 is a resilient object that is deformable (i.e., changeable in configuration) such that it changes in configuration under load and recovers its initial configuration when the load is removed. More particularly, in this embodiment, the spring 80 is an elastomeric spring (e.g., a rubber spring). In this example, the elastomeric spring 80 includes an elastomeric body 81 positioned in a housing 82 (e.g., a metallic housing).

The elastomeric body 81 includes elastomeric material (e.g., rubber) providing the spring 80 with compliance in the height direction of the track assembly $16_i$. A spring rate of the spring 80 is related to the weight of the agricultural vehicle 10 and a load carried by the vehicle 10. For instance, in some embodiments, the spring 80 may have a spring rate in the height direction of the track assembly $16_i$ of at least 4 kN/mm, in some cases at least 6 kN/mm, and in some cases at least 8 kN/mm. The spring rate may have any other suitable value in other embodiments.

In this embodiment, the elastomeric body 81 is cylindrical and includes a central opening 70. The elastomeric body 81 may have various other shapes in other embodiments.

The housing 82 houses the elastomeric body 81. In this embodiment, the housing 82 comprises a top portion 86 and a bottom portion 87 between which the elastomeric body 81 is disposed. In this case, the housing 82 is metallic (e.g., made of steel). In other cases, the housing 82 may be made of other materials. The housing 82 may be configured in various other ways in other embodiments.

In some cases, the elastomeric body 81 may rest against the housing 82 without being secured to the housing 82. In such cases, the bottom portion 87 of the housing 82 keeps the elastomeric body 81 from overextending or falling out when unloaded. In other cases, the elastomeric body 81 may be secured to the housing 82. For example, in some embodiments, the elastomeric body 81 may be bonded to the housing 82 using a suitable adhesive (e.g., a Chemlok™ rubber-to-metal adhesive in embodiments where the elastomeric body 81 is a rubber body and the housing 82 is metallic).

While in this embodiment it is an elastomeric spring, the spring 80 may be any other suitable type of spring in other embodiments. For example, in some embodiments, the spring 80 may be a coil spring (e.g., a metallic or polymeric coil spring), a leaf spring, a fluid spring (i.e., a spring including a liquid or gas contained in a container such as a cylinder or a bellows and variably compressed) such as a gas spring, or any other resilient object that changes in configuration under load and recovers its initial configuration when the load is removed. Thus, deformation (i.e., change in configuration) of the spring 80 may be achieved in various ways in other embodiments.

In this embodiment, the suspension 74 comprises a suspension link 85 mounted between the frame 17 and the bogie 50 carrying the mid-rollers $28_1$-$28_4$ to control movement of the bogie 50 relative to the frame 17. More particularly, in this embodiment, the suspension link 85 is secured to the bogie 50 and pivotally connected to the frame 17 about a pivot axis 66 to allow the suspension link 85 to pivot relative to the frame 17 about the pivot axis 66. In this case, the suspension link 85 is secured to the bogie 50 by fasteners and a pivot pin such that the bogie 50 is pivotable relative to the suspension arm 85 about the pivot axis 64. The suspension link 85 can help to isolate the spring 80 from all loads except loads in the height direction of the track assembly $16_i$ to ensure that the spring 80 deforms in this direction only.

The spring 80 rests on top of the suspension link 85. When the track assembly $16_i$ moves on the ground and the mid-rollers $28_1$-$28_4$ encounter a bump or other terrain variation, a rock or other object on the ground, or some other ground unevenness, the suspension link 85 can pivot about the pivot axis 66 to allow the bogie 50 to move upwardly against a spring force exerted by the spring 80, thereby compressing the spring 80. Upon release of the load to which it is subjected due to the mid-rollers $28_1$-$28_4$ having cleared the ground unevenness, the spring 80 can recover its original configuration, biasing the suspension link 85 and the bogie 50 back to their original positions.

In this embodiment, the spring 80 is located directly above the bogie 50. That is, the spring 80 is aligned with the bogie 50 in the longitudinal direction of the track assembly $16_i$ (i.e., at least part of the spring 80 overlaps at least part of the bogie 50 in the longitudinal direction of the track assembly $16_i$). More particularly, in this embodiment, the spring 80 is aligned with the pivot axis 64 of the bogie 50 in the longitudinal direction of the track assembly $16_i$ (i.e., at least part of the spring 80 overlaps the pivot axis 64 of the bogie 50 in the longitudinal direction of the track assembly $16_i$).

The frame 17 is configured to facilitate installation of the suspension 74 in the track assembly $16_i$.

For example, in this embodiment, the frame 17 comprises a resilient device mounting portion 47 for mounting the resilient device 75. More particularly, in this example, the resilient device mounting portion 47 includes a cavity 57 for receiving the spring 80. In some cases, the top portion 86 of the housing 82 of the spring 80 can be secured (e.g., bolted or welded) to an internal surface 55 defining the cavity 57. In other cases, the top portion 86 of the housing 82 of the spring 80 may be an integral part of the frame 17 (e.g., formed during casting). An opening 56 allows insertion of the spring 80 into the cavity 57 when installing the suspension 74. In this case, the opening 56 is generally circular. In other cases, the opening 56 may have various other shapes. The resilient device mounting portion 47 may be configured in various other ways in other embodiments.

Also, in this embodiment, the frame 17 comprises a suspension link mounting portion 65 for mounting the suspension link 85 to the frame 17 about the pivot axis 66. More particularly, in this example, the suspension link mounting portion 65 comprises fastening parts $30_1$, $30_2$ to fasten the suspension link 85 to the frame 17 via fasteners (e.g., bolts). In this case, the fastening parts $30_1$, $30_2$ include holes for receiving the fasteners fastening the suspension link 85 to the frame 17. In addition, in this example, the suspension link mounting portion 65 defines a recess 38 for accommodating a pivotal movement of the suspension link 85 relative to the frame 17 about the pivot axis 66. The suspension link mounting portion 65 may be configured in various other manners in other embodiments.

The suspension 74 may be configured in various other ways and/or using various other materials and/or suspension components in other embodiments.

For example, in other embodiments, the suspension 74 may comprise a damper (i.e., a shock absorber), such as a hydraulic or pneumatic damper, a frictional damper (based on dry or fluid friction) or any other type of damper, to dampen shocks experienced by the track assembly $16_i$, to a greater extent than the spring 80.

As another example, in other embodiments, the suspension link 85 may be omitted such that the spring 80 is secured directly to the bogie 50.

As another example, FIGS. 7 to 15 show a variant of the suspension 74 according to another embodiment of the invention. In this embodiment, the suspension 74 comprises a resilient device 175 mounted between the frame 17 and the mid-rollers $28_1$-$28_4$. The resilient device 175 is configured to change from a first configuration to a second configuration in response to a load and recover the first configuration in response to removal of the load to allow movement of the mid-rollers $28_1$-$28_4$ relative to the frame 17.

More particularly, in this example of implementation, the resilient device 175 is mounted between the frame 17 and the bogie 50 carrying the mid-rollers $28_1$-$28_4$ to allow movement of the bogie 50 relative to the frame 17. In this example, compliance of the resilient device 175 allows movement of the bogie 50 relative to the frame 17 in the height direction of the track assembly $16_i$. An example of such a movement is represented by arrow $M_h$ in FIG. 9B, where the arrow $M_h$ represents a velocity vector of a point of the bogie 50 at an instant at which the movement of the bogie 50 relative to the frame 17 begins. Thus, when the vehicle 10 is on a horizontal ground surface, the resilient device 175 allows vertical movement of the bogie 50 relative to the frame 17.

In addition, in this example of implementation, compliance of the resilient device 175 allows the bogie 50 to move relative to the frame 17 transversally to the height direction of the track assembly $16_i$, i.e., allows movement of the bogie 50 relative to the frame 17 in a direction transversal to the height direction of the track assembly $16_i$. An example of such a movement is represented by arrow $M_t$ in FIG. 9C, where the arrow $M_t$ represents a velocity vector of a point of the bogie 50 at an instant at which the movement of the bogie 50 relative to the frame 17 begins. As such, when the vehicle 10 is on a horizontal ground surface, the resilient device 175 allows movement of the track assembly $16_i$ in a non-vertical direction (i.e., a direction not purely vertical).

A movement of the bogie 50 relative to the frame 17 in a direction transversal to the height direction of the track assembly $16_i$ induces a displacement of the bogie 50 relative to the frame 17 that can be viewed as including at least one of: (i) a translation of the bogie 50 relative to the frame 17 in the longitudinal direction of the track assembly $16_i$, as represented by arrow $T_l$ in FIG. 9C; (ii) a translation of the bogie 50 relative to the frame 17 in the widthwise direction of the track assembly $16_i$, as represented by arrow $T_w$ in FIG. 9C; (iii) a rotation of the bogie 50 relative to the frame 17 about an axis of rotation $R_l$ generally parallel to the longitudinal direction of the track assembly $16_i$ (i.e., generally parallel to the longitudinal axis 59 of the track assembly $16_i$); and (iv) a rotation of the bogie 50 relative to the frame 17 about an axis of rotation $R_w$ generally parallel to the widthwise direction of the track assembly $16_i$ (i.e., generally perpendicular to the longitudinal axis 59 of the track assembly $16_i$). The displacement of the bogie 50 resulting from the movement of the bogie 50 relative to the frame 17 transversal to the height direction of the track assembly $16_i$ may also include at least one of: (i) a translation of the bogie relative to the frame 17 in the height direction of the track assembly $16_i$, as represented by arrow $T_h$ in FIG. 9C; and (ii) a rotation of the bogie 50 relative to the frame 17 about an axis of rotation $R_h$ generally parallel to the height direction of the track assembly $16_i$.

This ability of the bogie 50 to move relative to the frame 17 transversally to the height direction of the track assembly $16_i$ thus provides additional degrees of freedom of movement of the bogie 50. For example, in this embodiment, the ability of the bogie 50 to translate relative to the frame 17 in the widthwise direction of the track assembly $16_i$ (arrow $T_w$) and rotate relative to the frame 17 about the axis of rotation $R_l$ generally parallel to the longitudinal direction of the track assembly $16_i$ provides a "roll" capability to the bogie 50. In that sense, the axis of rotation $R_l$ of the bogie 50 can be viewed as a "roll" axis. Furthermore, the ability of the bogie 50 to translate relative to the frame 17 in the longitudinal direction of the track assembly $16_i$ (arrow $T_l$) and rotate relative to the frame 17 about the axis of rotation $R_w$ generally parallel to the widthwise direction of the track assembly $16_i$ provides an additional "pitch" capability to the bogie 50, which is additional to pitching of the bogie 50 about its pitch axis 64. In that sense, the axis of rotation $R_w$ of the bogie 50 can be viewed as an additional "pitch" axis.

Since in this embodiment the pivot axis 64 of the bogie 50 is transversal (in this case perpendicular) to the longitudinal direction of the track assembly $16_i$, the axis of rotation $R_l$ generally parallel to the longitudinal direction of the track assembly $16_i$ about which the bogie 50 can rotate due to compliance of the resilient device 175 is also transversal (in this case perpendicular) to the pivot axis 64 of the bogie 50.

The resilient device 175 comprises a spring 180. The spring 180 is a resilient object that is deformable such that it changes in configuration under load and recovers its initial configuration when the load is removed. More particularly, in this embodiment, the spring 180 is an elastomeric spring (e.g., a rubber spring). In this example, the elastomeric spring 180 includes an elastomeric body 181 positioned in a housing 182 (e.g., a metallic housing).

The elastomeric body 181 includes elastomeric material (e.g., rubber) providing the spring 180 with compliance in the height direction of the track assembly $16_i$. A spring rate of the spring 180 is related to the weight of the agricultural vehicle 10 and a load carried by the vehicle 10. For instance, in some embodiments, the spring 180 may have a spring rate in the height direction of the track assembly $16_i$ of at least 4 kN/mm, in some cases at least 6 kN/mm, and in some cases at least 8 kN/mm. The spring rate may have any other suitable value in other embodiments.

In this embodiment, the spring 180 is tapered such that the elastomeric body 181 is tapered. Specifically, in this case, the spring 180 is conical such that the elastomeric body 181 is conical. The elastomeric body 181 includes a central opening 170. The elastomeric body 181 may have various other shapes in other embodiments.

The tapered (in this case conical) shape of the spring 180 provides the spring 180 with compliance in directions transversal to the height direction of the track assembly $16_i$ (i.e., in non-vertical directions when the vehicle 10 is on a horizontal ground surface). For example, in some embodiments, the spring 180 may have a spring rate in a direction transversal to the height direction of the track assembly $16_i$ that is no less than (i.e., equal to or greater than) its spring rate in the height direction of the track assembly $16_i$. For instance, in this embodiment, the spring 180 may have a spring rate in each of the longitudinal direction of the track assembly $16_i$ and the widthwise direction of the track assembly $16_i$ that is no less than its spring rate in the height direction of the track assembly $16_i$. In this case, the conical configuration of the spring 180 can provide substantially equal stiffness in all directions perpendicular to the height direction of the track assembly $16_i$. Thus, when the vehicle 10 is on a horizontal ground surface, the spring 180 may have a spring rate in a non-vertical direction (e.g., a horizontal direction) that is no less than its spring rate in the vertical direction. In this case, the conical configuration of the spring 180 can provide substantially equal stiffness in all horizontal directions.

Figure 23:
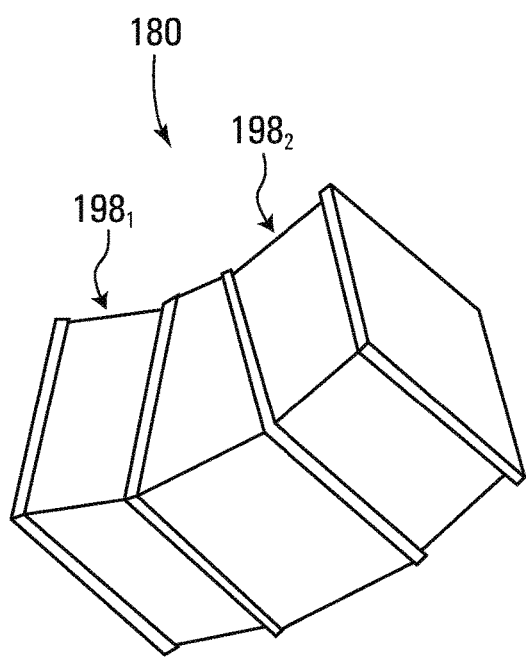
FIGS. 23 and 24 show a shear spring in a variant of the resilient device of the suspension of the track assembly of FIG. 7.
Figure 24:
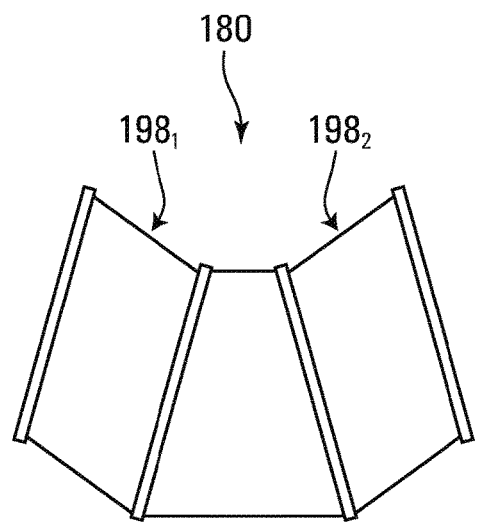
Figure 25:
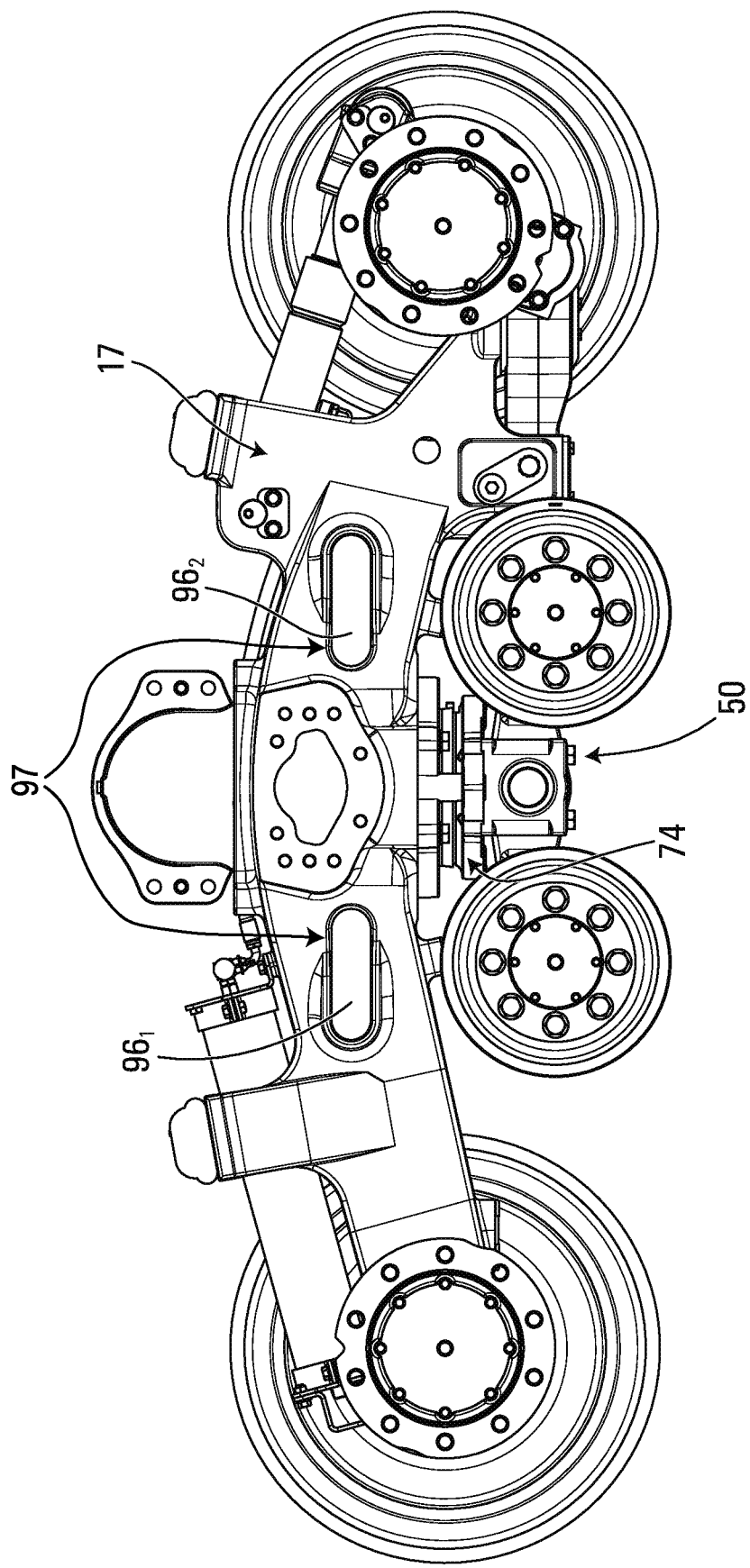
FIGS. 25 to 34 show the frame, the suspension and the bogie of a variant of the track assembly.
Figure 26:
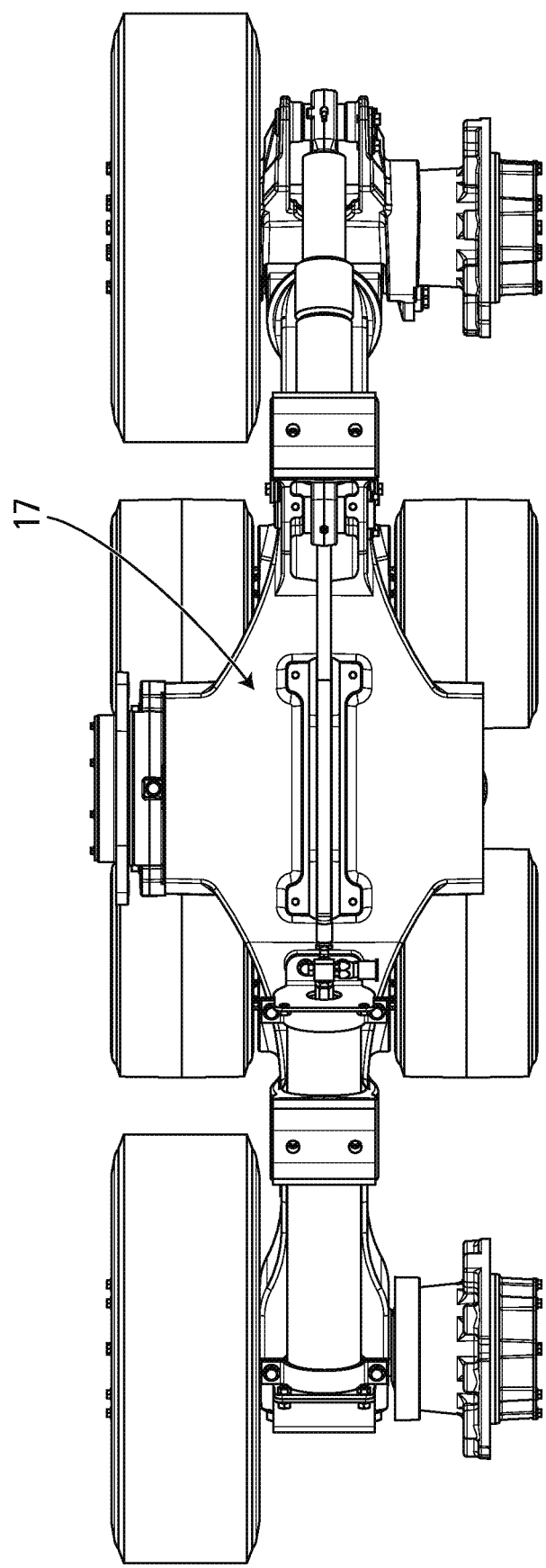
Figure 27:
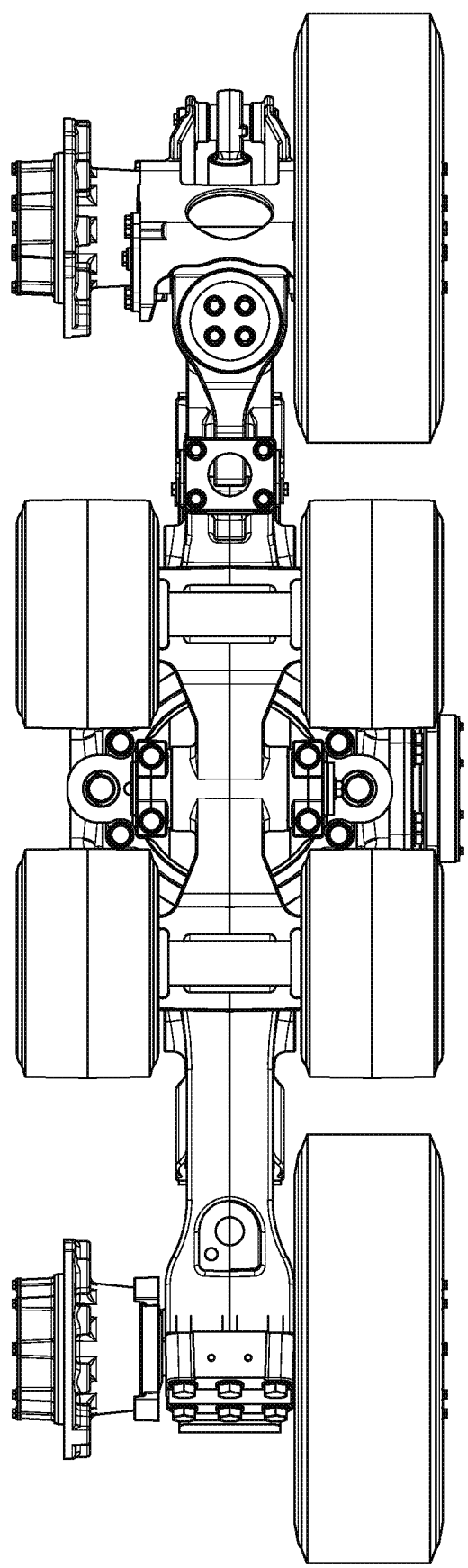
Figure 28:
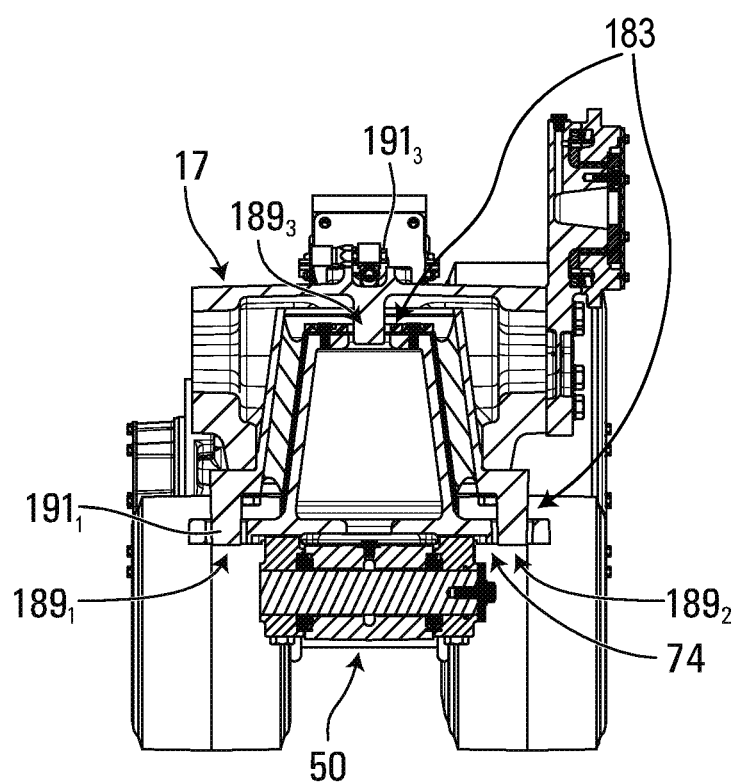
Figure 29:
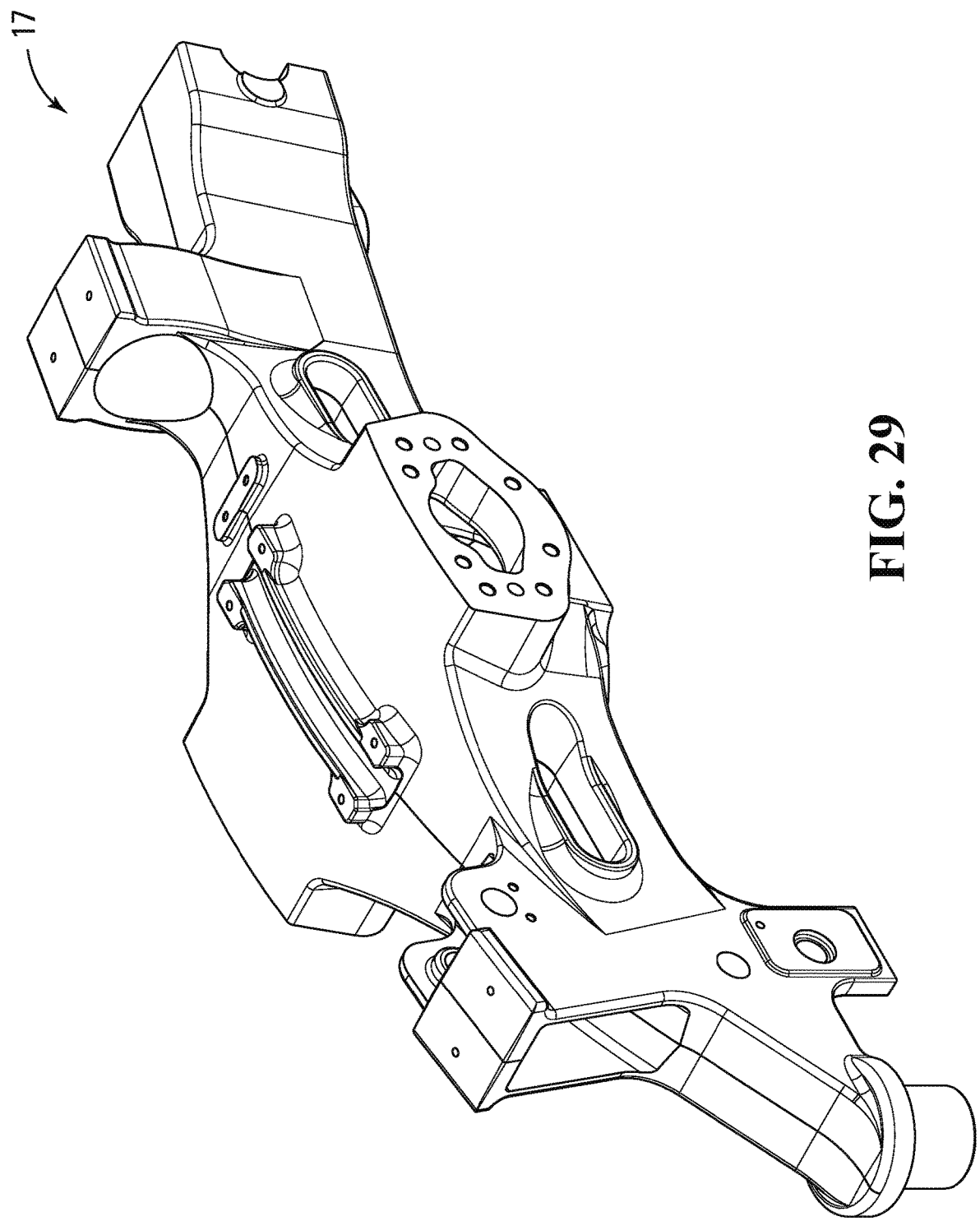
Figure 30:
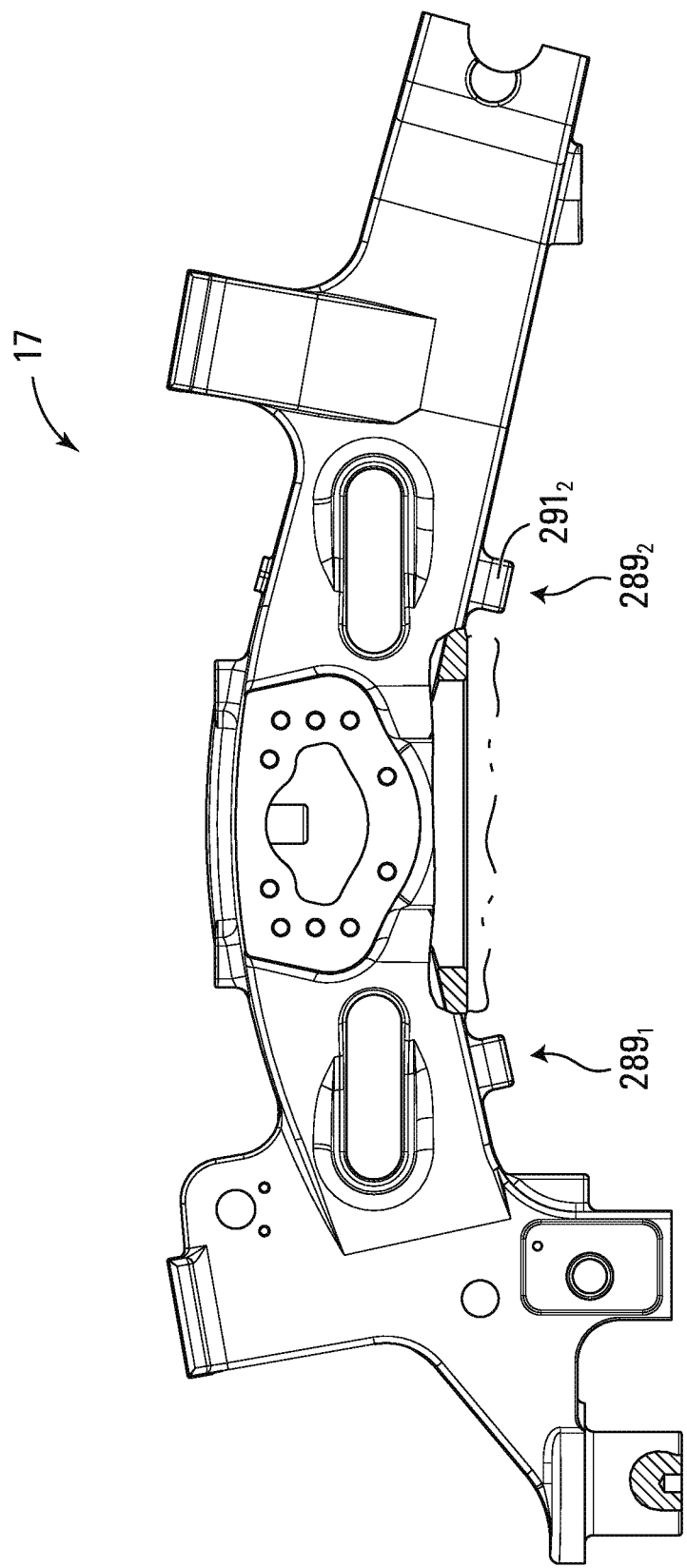
Figure 31:
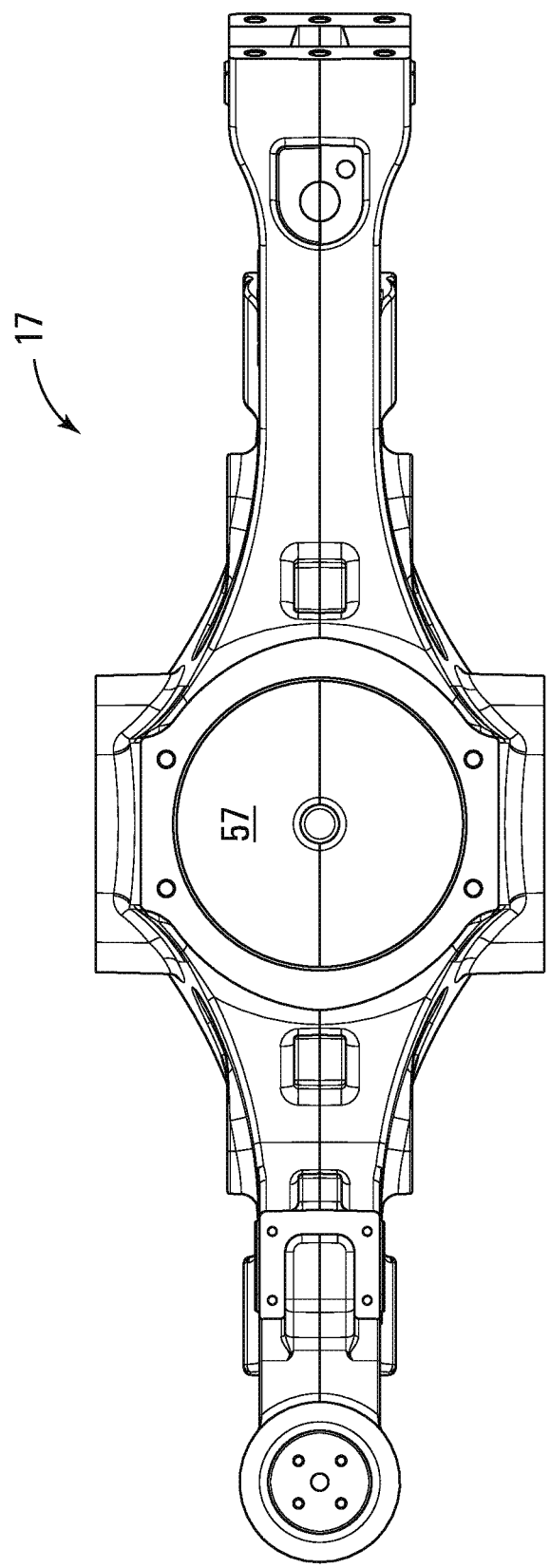
Figure 32:
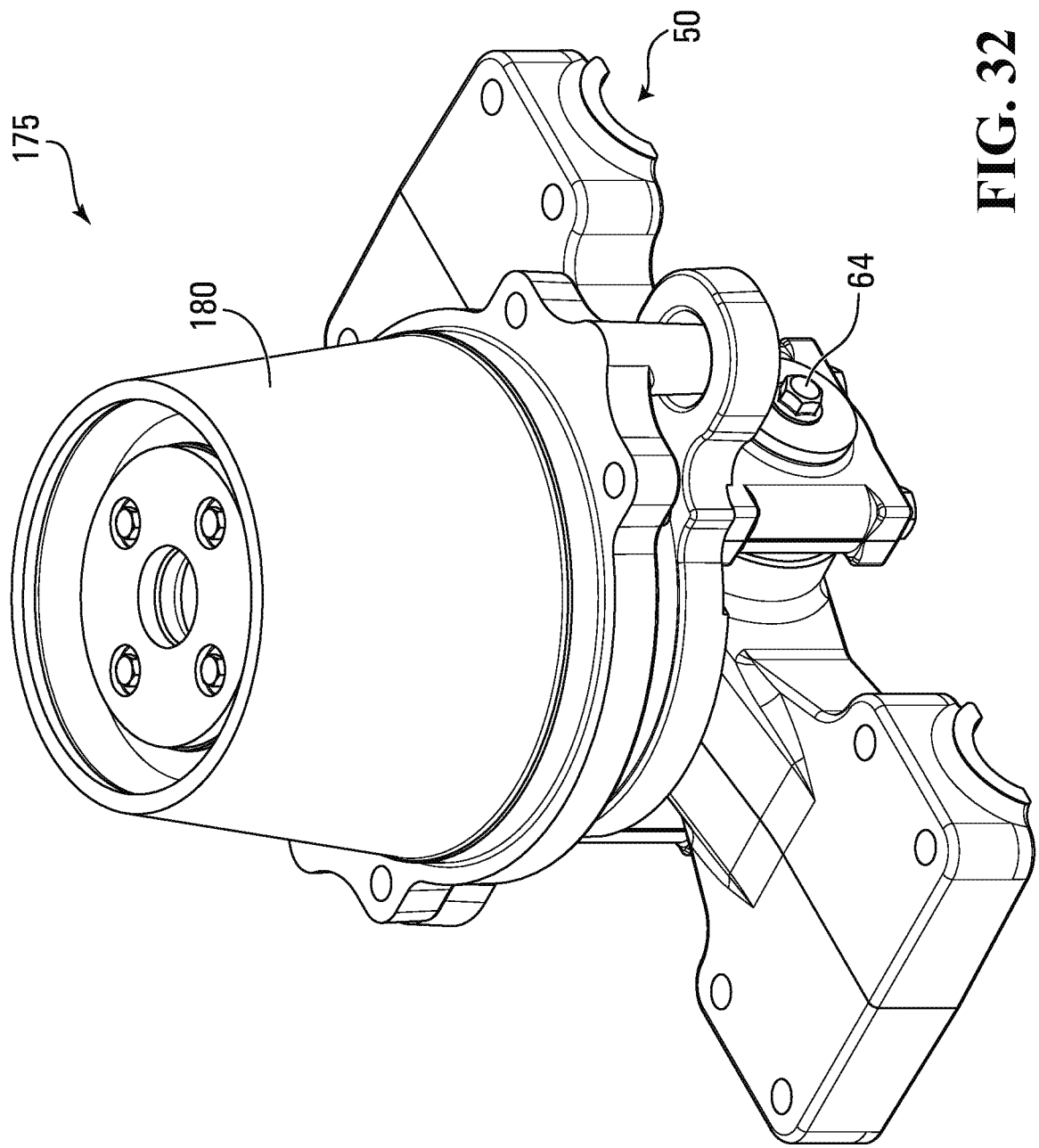
Figure 33:
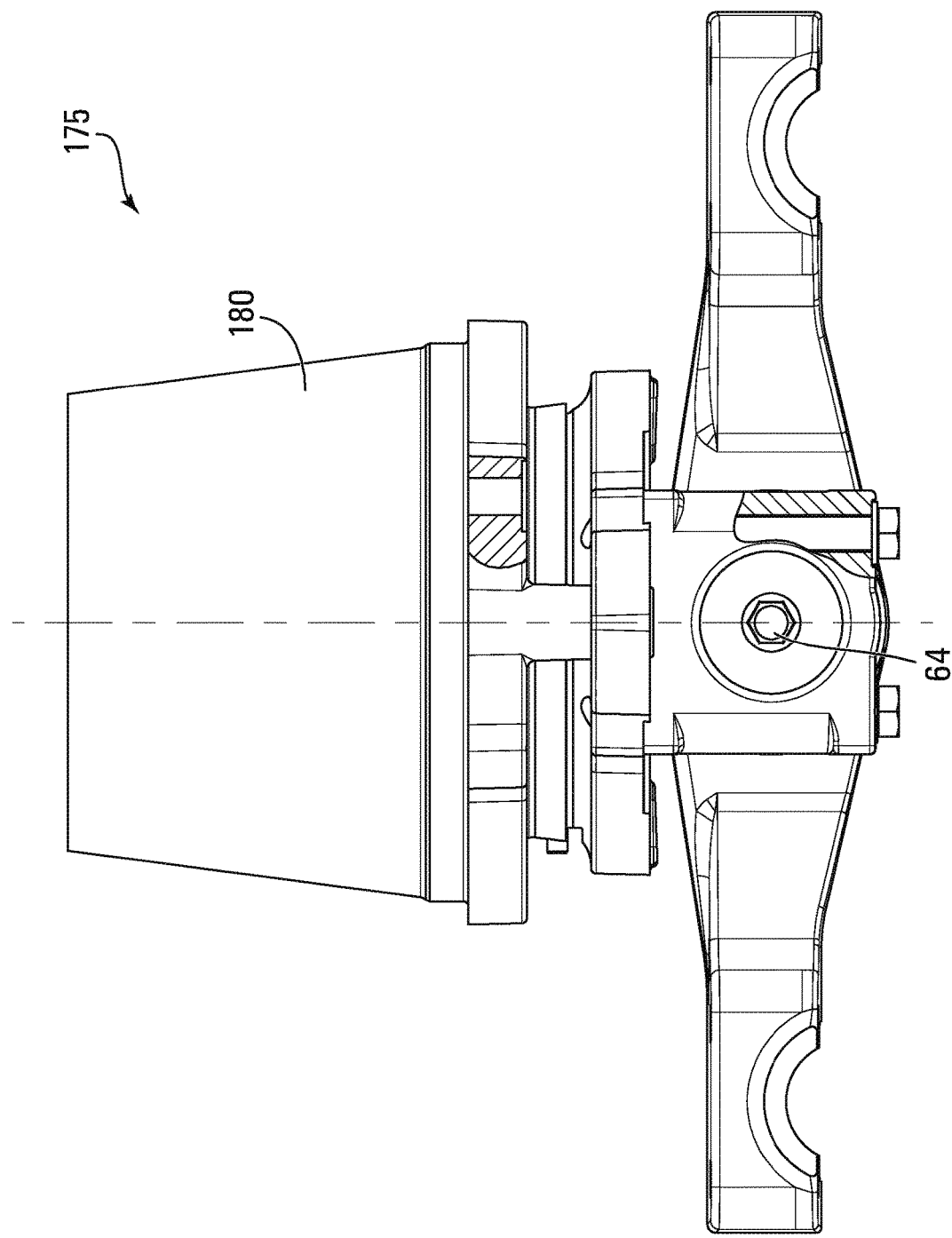
Figure 34:
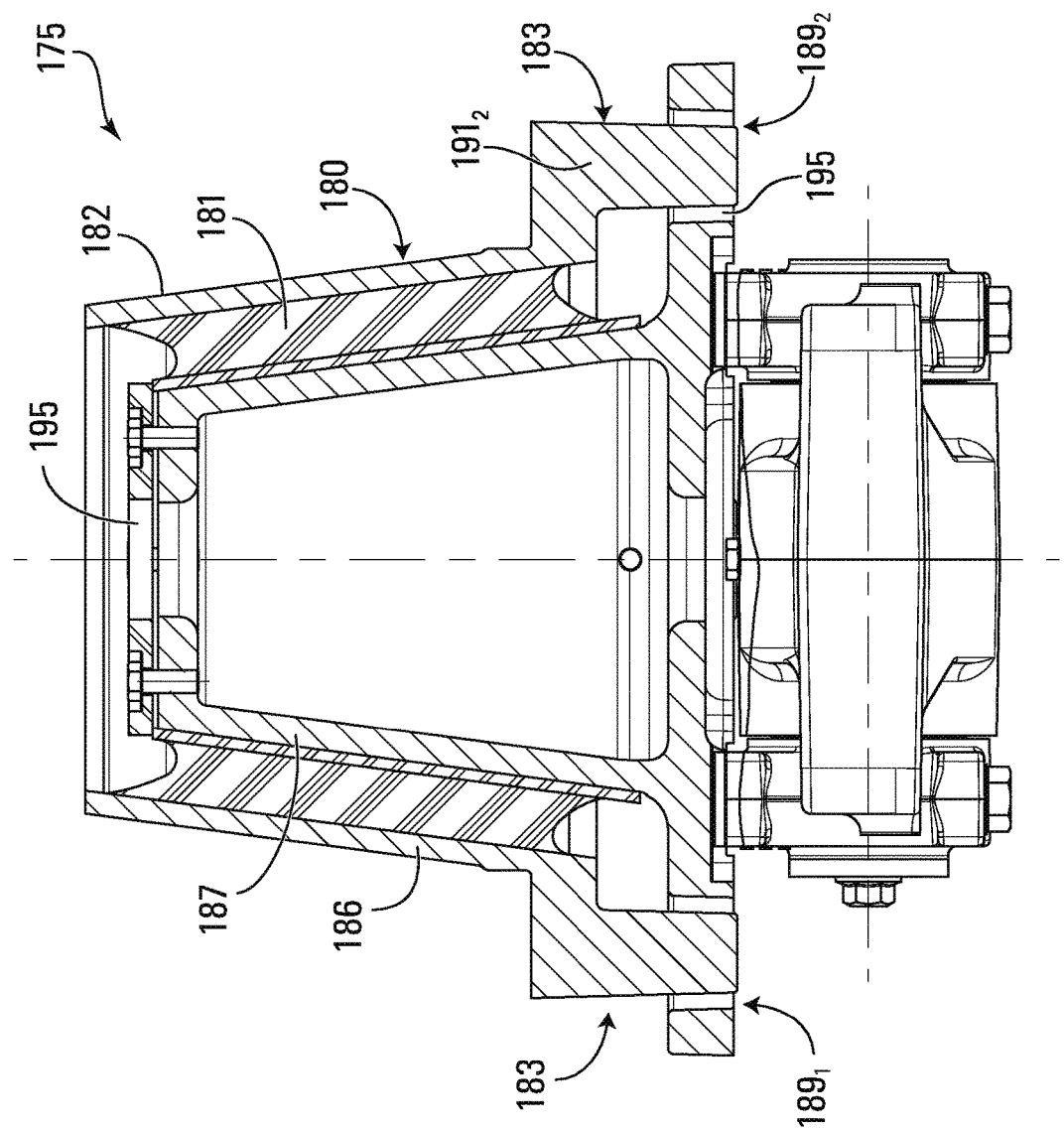
Figure 35:
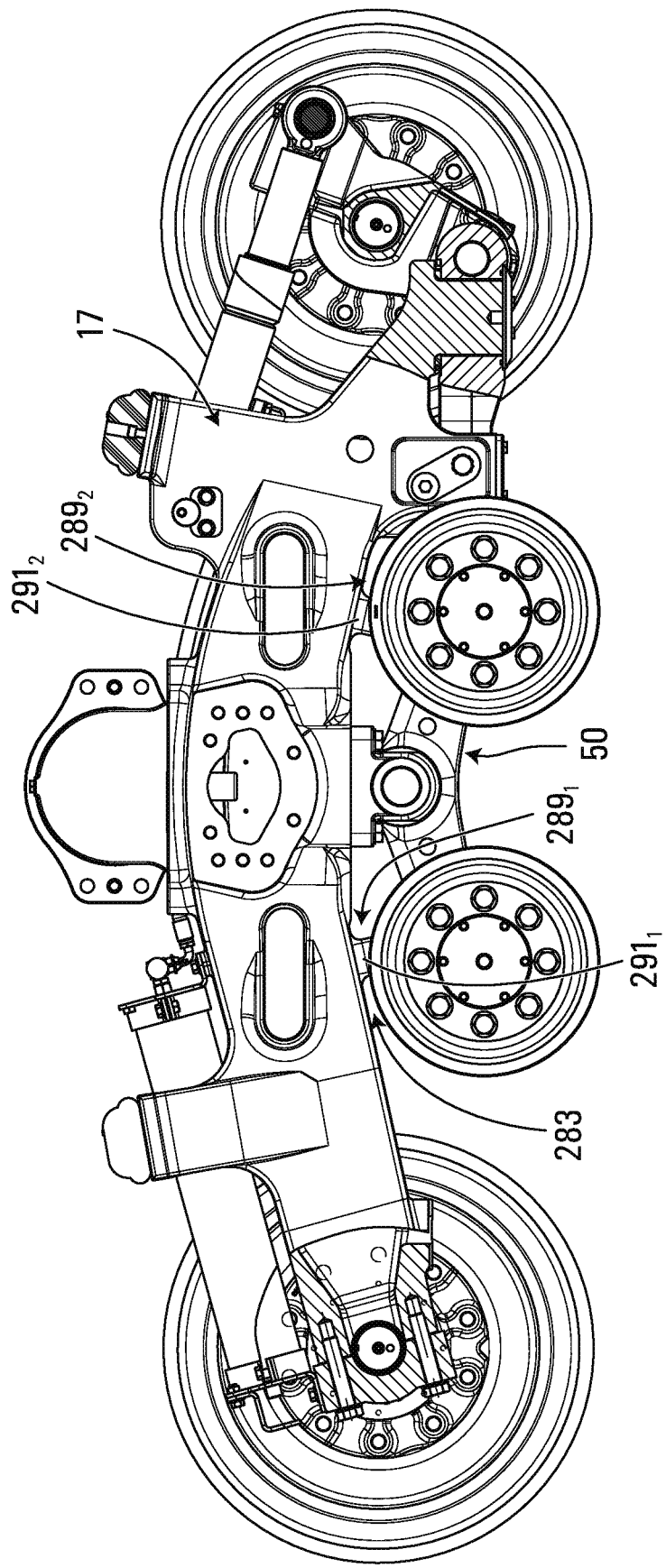
FIGS. 35 to 38 show a variant of the track assembly of FIGS. 25 to 34 in which there is no suspension between the frame and the bogie.
Figure 36:
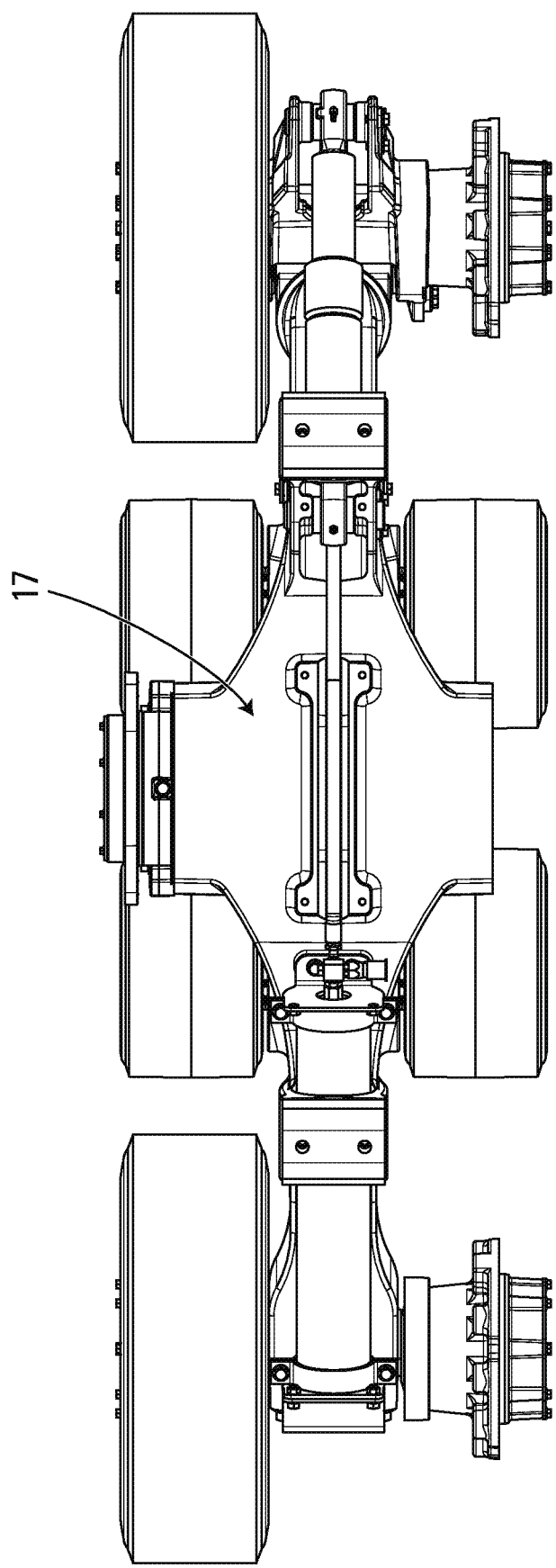
Figure 37:
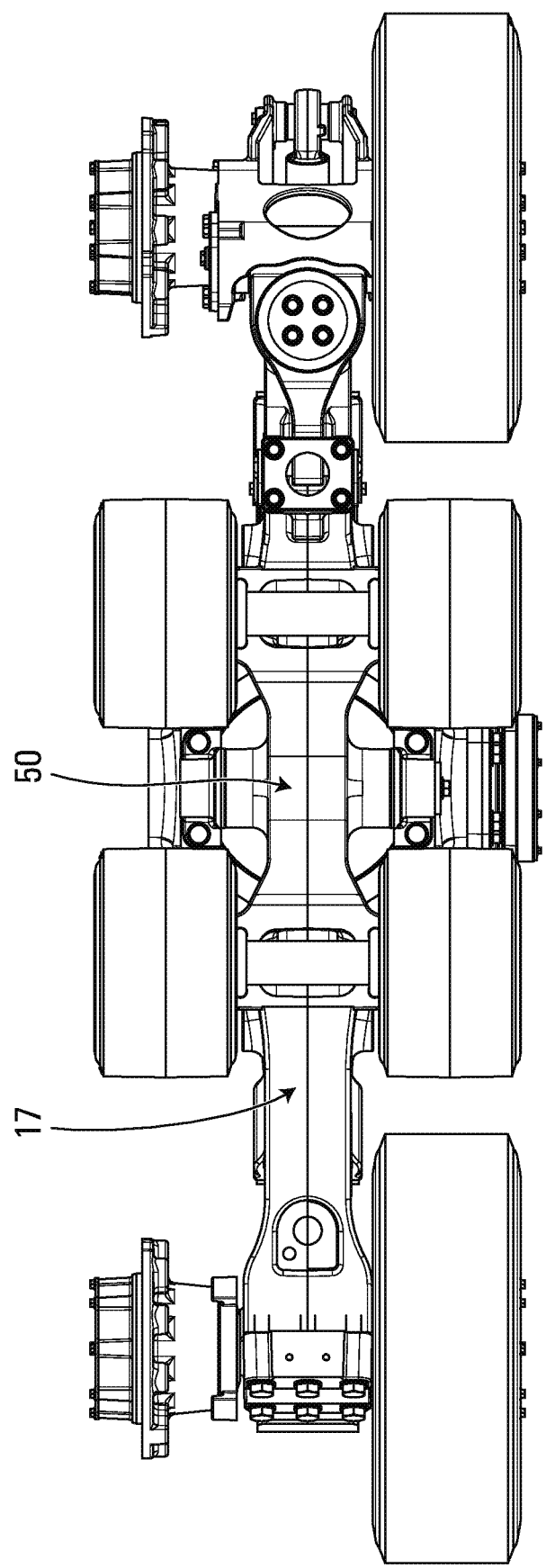

While in this embodiment it is conical, in other embodiments, the spring 180 may be configured differently but still provide compliance in one or more directions transversal to the height direction of the track assembly $16_i$. For example, in some embodiments, as shown in FIGS. 23 and 24, the spring 180 may comprise a plurality of (in this case two) shear spring pads $198_1$, $198_2$. In this case, the shear spring pads $198_1$, $198_2$ are rectangular rubber pads arranged opposite to one another in a converging relationship at an angle to the height direction of the track assembly $16_i$. Shear spring pads such as the shear spring pads $198_1$, $198_2$ may have various other shapes, may be arranged in various other manners, and/or may be present in various other numbers in other cases (e.g., compound angle shear pads). Examples of shear springs that may be used in some embodiments include Chevron™ springs and Offset Shear™ springs commercialized by Trelleborg Industrial AVS and equivalent shear springs.

The housing 182 houses the elastomeric body 181. In this embodiment, the housing 182 is tapered, in this case conical. The housing 182 comprises an outer portion 186 and an inner portion 187 between which the elastomeric body 181 is disposed. The outer portion 186 is secured to the frame 17. More particularly, in this example, the outer portion 186 includes a flange 169 comprising holes $143_1$-$143_3$ for receiving fasteners to fasten the housing 182 to the frame 17. To that end, in this embodiment, the frame 17 comprises holes $91_1$-$91_4$ for receiving the fasteners extending through the holes $143_1$-$143_3$ of the housing 182. In this case, the housing 182 is metallic (e.g., made of steel). In other cases, the housing 182 may be made of other materials. The housing 182 may be configured in various other ways in other embodiments.

The elastomeric body 181 may be secured to the housing 182. For example, in some embodiments, the elastomeric body 181 may be bonded to the housing 182 using a suitable adhesive (e.g., a Chemlok™ rubber-to-metal adhesive in embodiments where the elastomeric body 181 is a rubber body and the housing 82 is metallic).

In this embodiment, the resilient device 175 supports the mid-rollers $28_1$-$28_4$. More particularly, in this embodiment, the resilient device 175 supports the bogie 50 carrying the mid-rollers $28_1$-$28_4$. To that end, the resilient device 175 comprises a support 190 coupled to the bogie 50 to support the bogie 50. In this example, the support 190 extends from the inner portion 187 of the housing 182 and includes a pair of brackets $192_1$, $192_2$ which are spaced apart in the widthwise direction of the track assembly $16_i$ and configured to receive a central part of the bogie 50 through which passes the bogie's pivot axis 64. In this case, the support 190 is integral with the inner portion 187 of the housing 182. Each of the brackets $192_1$, $192_2$ includes an opening 193 to receive a portion of the bogie 50 and a plurality of holes $194_1$-$194_4$ to receive fasteners fastening the bogie 50 to the support 190. The support 190 may be configured in various other ways in other embodiments.

In this example of implementation, the spring 180 is located directly above the bogie 50. That is, the spring 180 is aligned with the bogie 50 in the longitudinal direction of the track assembly $16_i$ (i.e., at least part of the spring 180 overlaps at least part of the bogie 50 in the longitudinal direction of the track assembly $16_i$).

More particularly, in this embodiment, the spring 180 is aligned with the pivot axis 64 of the bogie 50 in the longitudinal direction of the track assembly $16_i$ (i.e., at least part of the spring 180 overlaps the pivot axis 64 of the bogie 50 in the longitudinal direction of the track assembly $16_i$).

When a ground area beneath the mid-rollers $28_1$-$28_4$ is uneven (e.g., due to a terrain elevation or a rock or other object on the ground beneath the mid-rollers $28_1$-$28_4$), the suspension 74 allows the bogie 50 to move upwardly relative to the frame 17 against a spring force exerted by the spring 180, thereby deforming the spring 180. Upon release of the load to which it is subjected due to the mid-rollers $28_1$-$28_4$ having cleared the uneven ground area, the spring 180 can recover its original configuration, biasing the bogie 50 back to its original position.

Figure 9A:
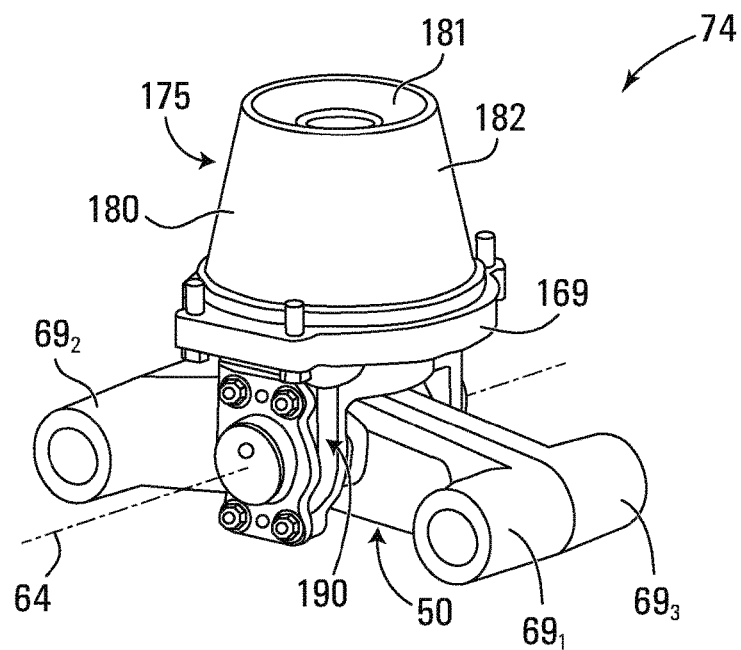
FIGS. 9A and 11 shows a variant of the suspension and the bogie for the track assembly of FIG. 7.
Figure 9B:
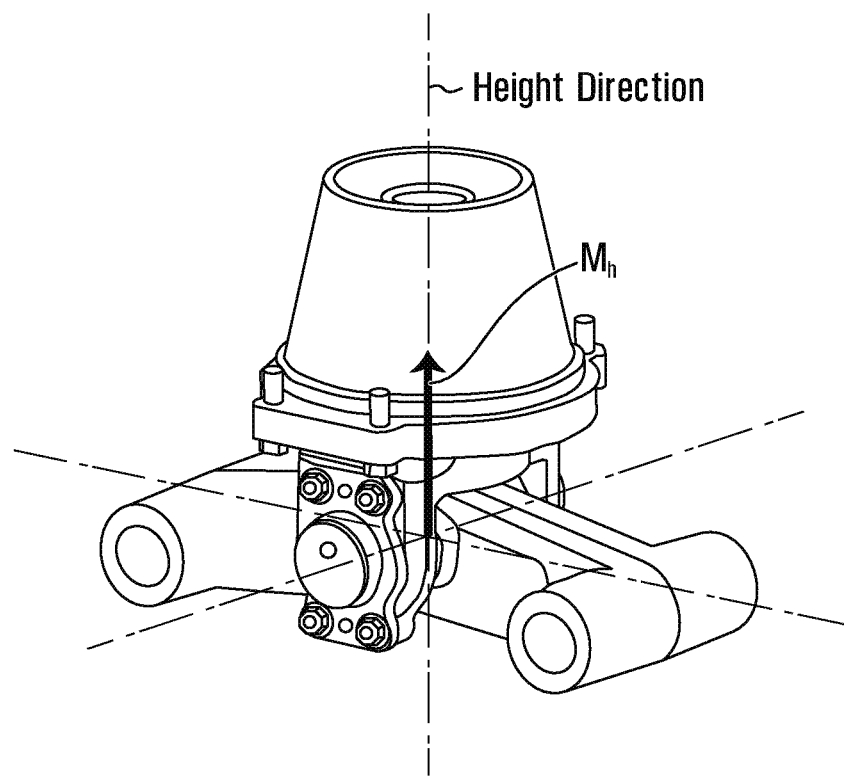
FIGS. 9B to 9E illustrates potential movements of the bogie for the track assembly of FIG. 7

The bogie 50 may move relative to the frame 17 in the height direction of the track assembly $16_i$, as shown by arrow $M_h$ in FIG. 9B. In this example, this movement induces a translation of the bogie 50 relative to the frame 17 and shearing of the spring 180 in the height direction of the track assembly 16$_i$.

Figure 9C:
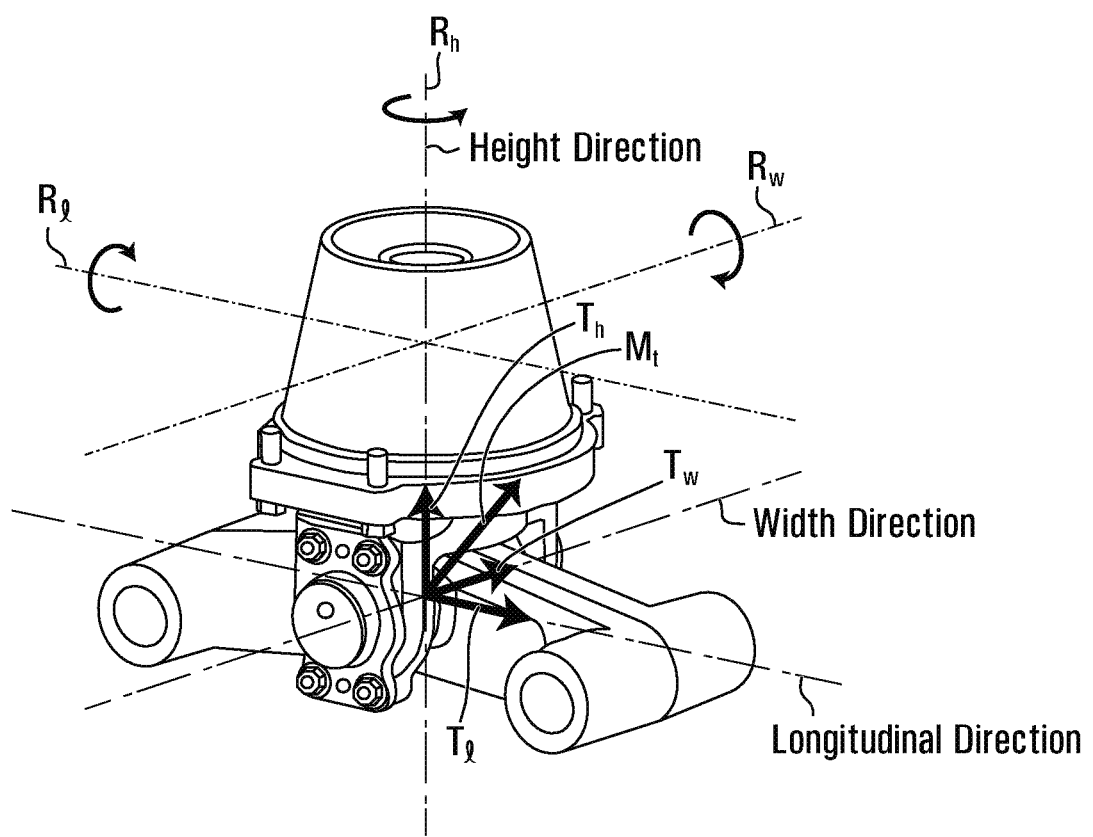

In some cases, the bogie 50 may move relative to the frame 17 in a direction transversal to the height direction of the track assembly 16$_i$, as shown by arrow M$_t$ in FIG. 9C. In this example, this movement induces at least one of: (i) a translation of the bogie 50 relative to the frame 17 in the longitudinal direction of the track assembly 16$_i$, as represented by arrow T$_l$; (ii) a translation of the bogie 50 relative to the frame 17 in the widthwise direction of the track assembly 16$_i$, as represented by arrow T$_w$; (iii) a rotation of the bogie 50 relative to the frame 17 about an axis of rotation R$_l$ generally parallel to the longitudinal direction of the track assembly 16$_i$; and (iv) a rotation of the bogie 50 relative to the frame 17 about an axis of rotation R$_w$ generally parallel to the widthwise direction of the track assembly 16$_i$. This movement may also include a translation of the bogie relative to the frame 17 in the height direction of the track assembly 16$_i$, as represented by arrow T$_h$, and/or a rotation of the bogie 50 relative to the frame 17 about an axis of rotation R$_h$ generally parallel to the height direction of the track assembly 16$_i$. In such cases, this movement causes compression of a portion of the elastomeric body 181, stretching of an opposite portion of the elastomeric body 182, and possibly shearing of the elastomeric body 182.

Figure 9D:
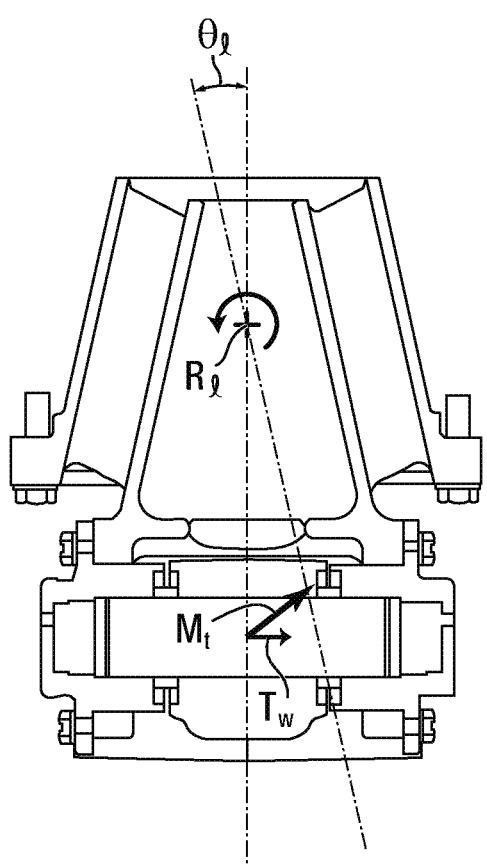

For example, in this embodiment, as shown in FIG. 9D, when a ground area beneath the mid-rollers 28$_1$-28$_4$ is uneven in the widthwise direction of the track assembly 16$_i$ (e.g., due to a side hill or other terrain variation, a rock or other object on the ground beneath the mid-rollers 28$_1$, 28$_2$ or beneath the mid-rollers 28$_1$, 28$_3$, etc.), the compliance of the spring 180 in the height direction of the track assembly 16$_i$ and in the widthwise direction of the track assembly 16$_i$ allows movement of the bogie 50 relative to the frame 17 in a direction transversal to the height direction of the track assembly 16$_i$ (arrow M$_t$) such that the bogie 50 is displaced relative to the frame 17 both in the height direction of the track assembly 16$_i$ and in the widthwise direction of the track assembly 16$_i$ in order to conform to the uneven ground area. In this case, this movement of the bogie 50 relative to the frame 17 can be viewed as inducing a translation T$_w$ of the bogie 50 relative to the frame 17 in the widthwise direction of the track assembly 16$_i$ and a rotation of the bogie 50 about an axis of rotation R$_l$ generally parallel to the longitudinal direction of the track assembly 16$_i$. This rotation of the bogie 50 can be seen as a quasi-pivotal movement of the bogie 50 about the axis of rotation R$_l$. In some cases, the rotation of the bogie 50 about the axis of rotation R$_l$ may be more significant than the translation T$_w$ of the bogie 50 relative to the frame 17 in the widthwise direction of the track assembly 16$_i$. In other cases, the translation T$_w$ of the bogie 50 relative to the frame 17 in the widthwise direction of the track assembly 16$_i$ may be more significant than the rotation of the bogie 50 about the axis of rotation R$_l$.

A rotation of the bogie 50 about an axis of rotation R$_l$ generally parallel to the longitudinal direction of the track assembly 16$_i$ allowed by the spring 180 defines an angular displacement θ$_l$ of the bogie 50 relative to the frame 17. The angular displacement θ$_l$ of the bogie 50 can take on any suitable value. For example, in some embodiments, the angular displacement θ$_l$ of the bogie 50 may be at least 1°, in some cases at least 2°, in some cases at least 3°, and in some cases even more (e.g., 5°, 10°, 15° or more). The angular displacement θ$_l$ of the bogie 50 can take on various other values in other embodiments.

Figure 9E:
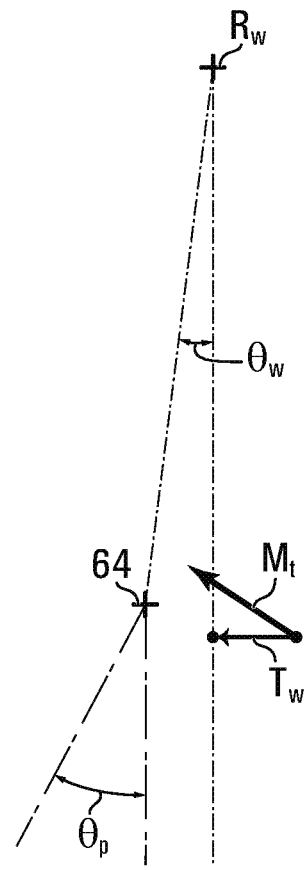
Figure 10:
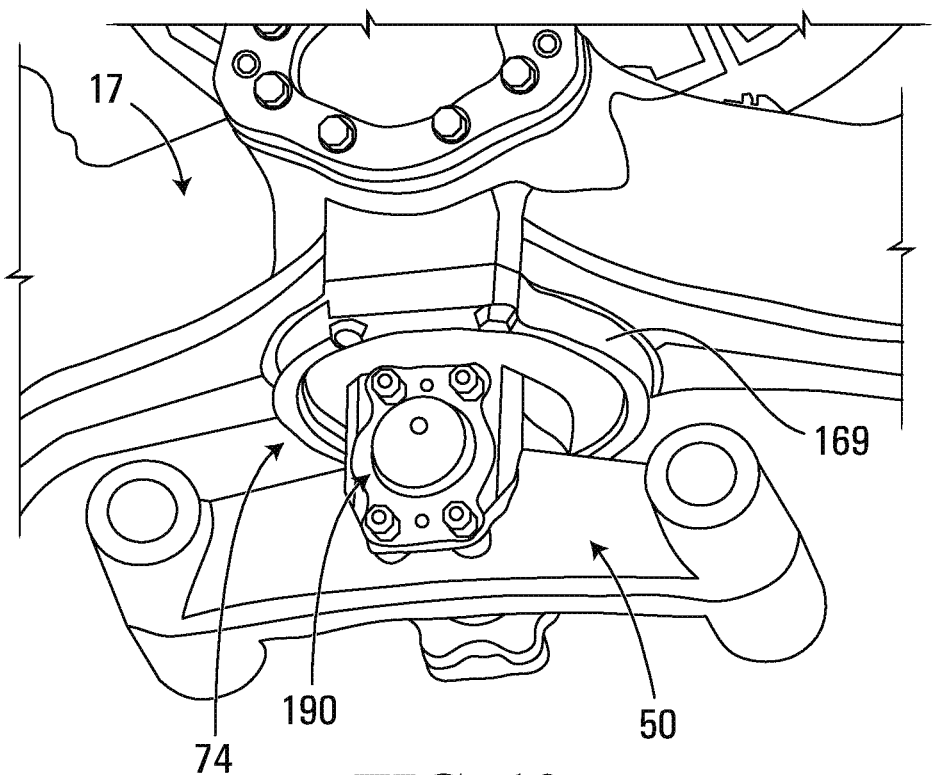
FIGS. 10, 14 and 15 show the frame, the suspension, and the bogie for the track assembly of FIG. 7.
Figure 11:
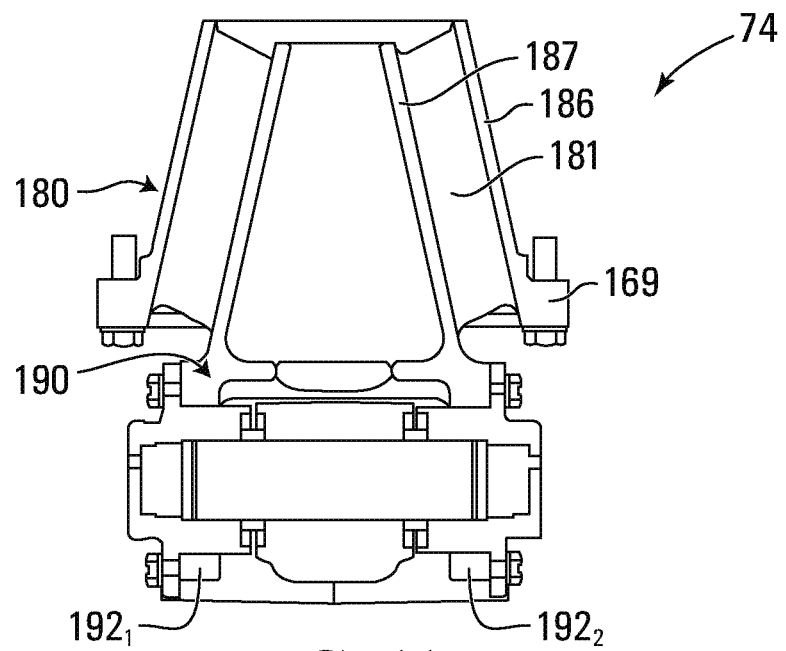
Figure 12:
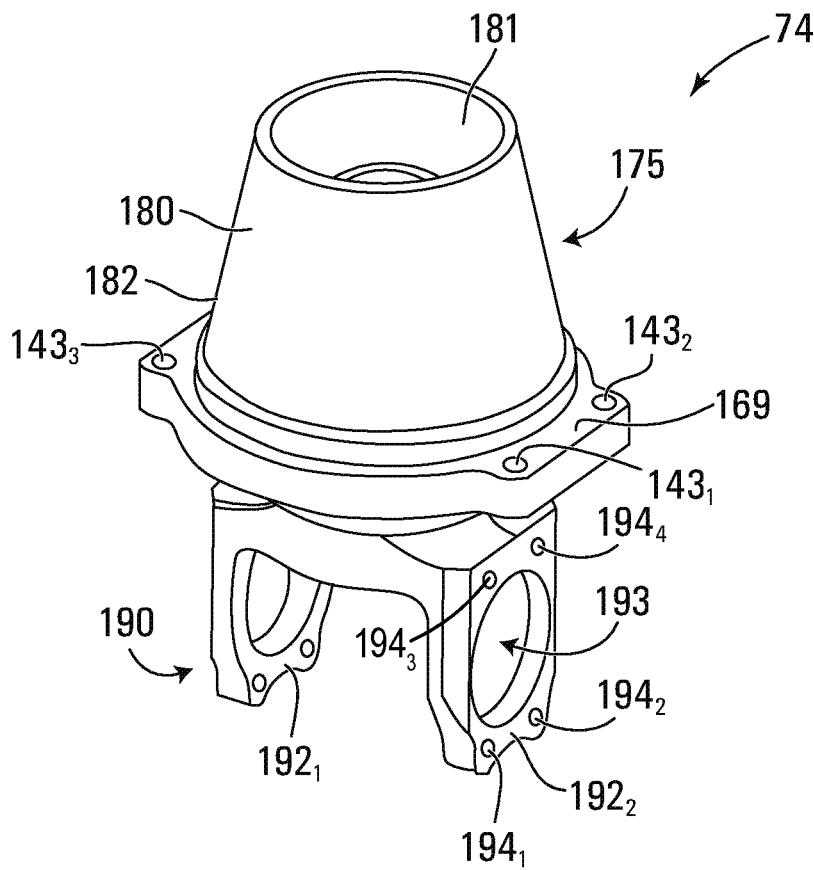
FIGS. 12 and 13 show a resilient device of the suspension of the track assembly of FIG. 7.
Figure 13:
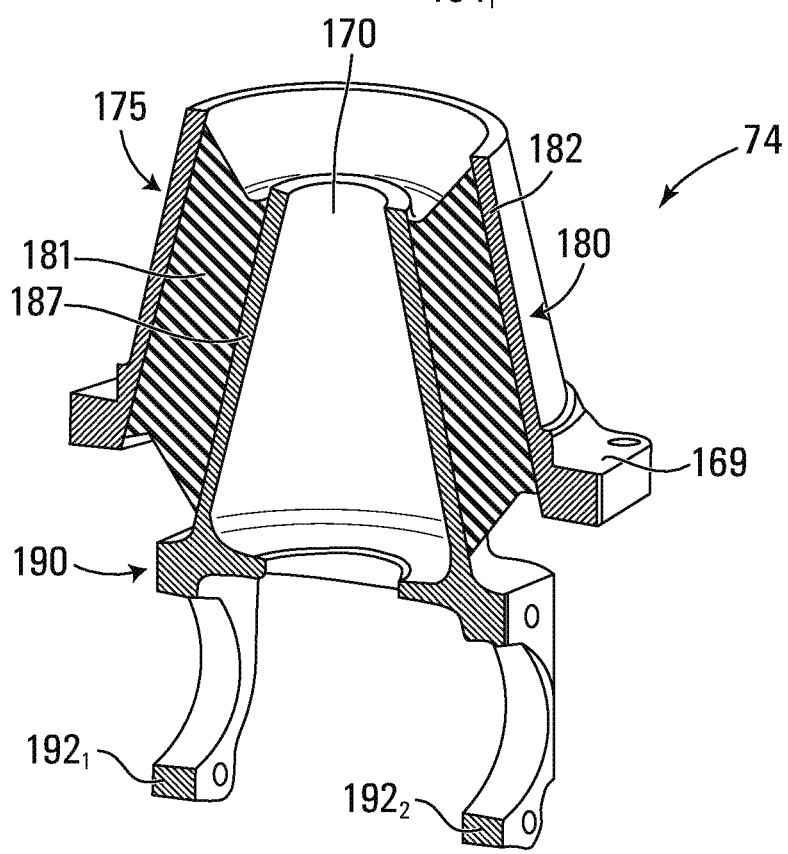
Figure 14:
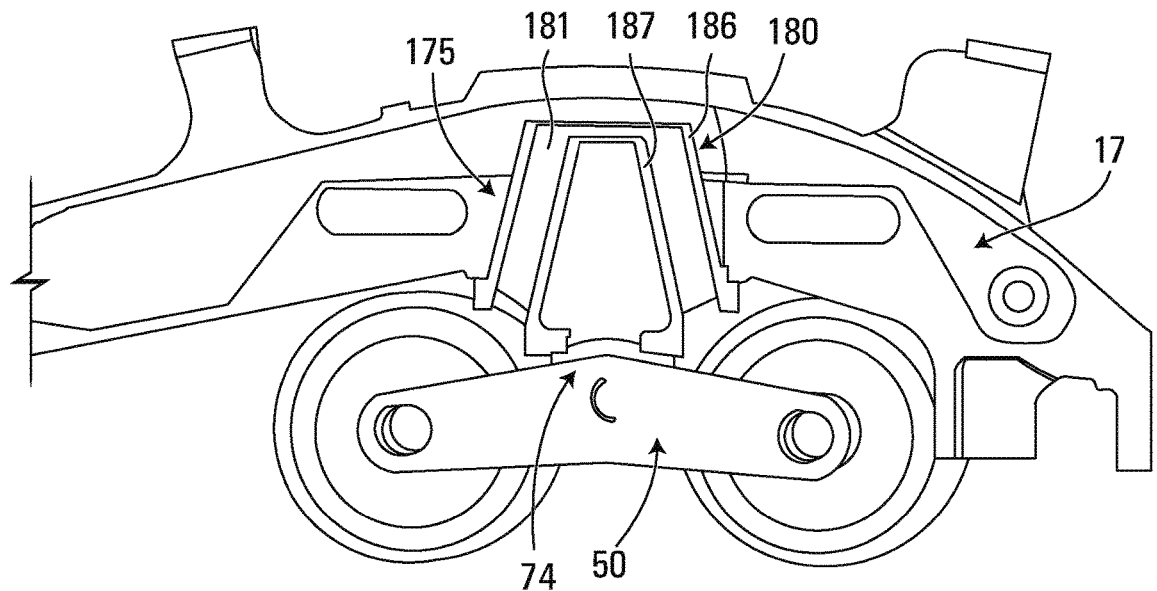
Figure 15:
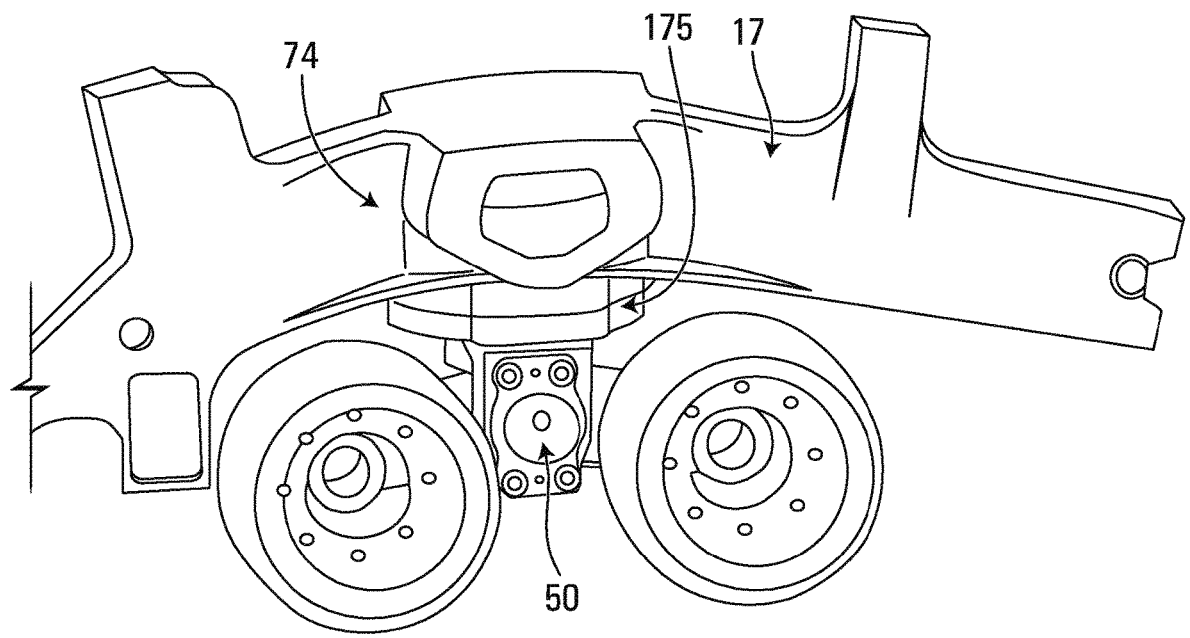
Figure 16:
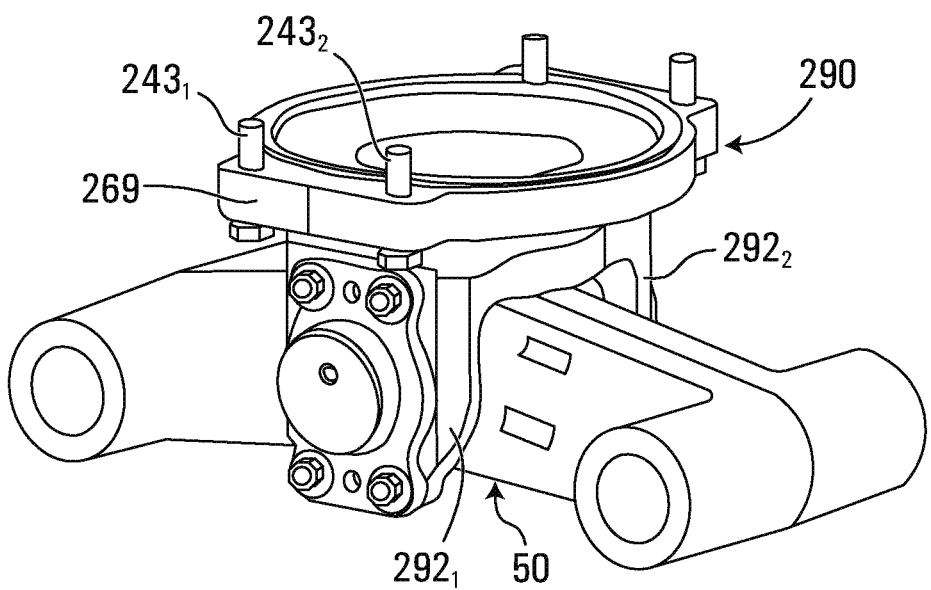
FIGS. 16 to 19 show another variant of the track assembly in which there is no suspension between the frame and the bogie.
Figure 17:
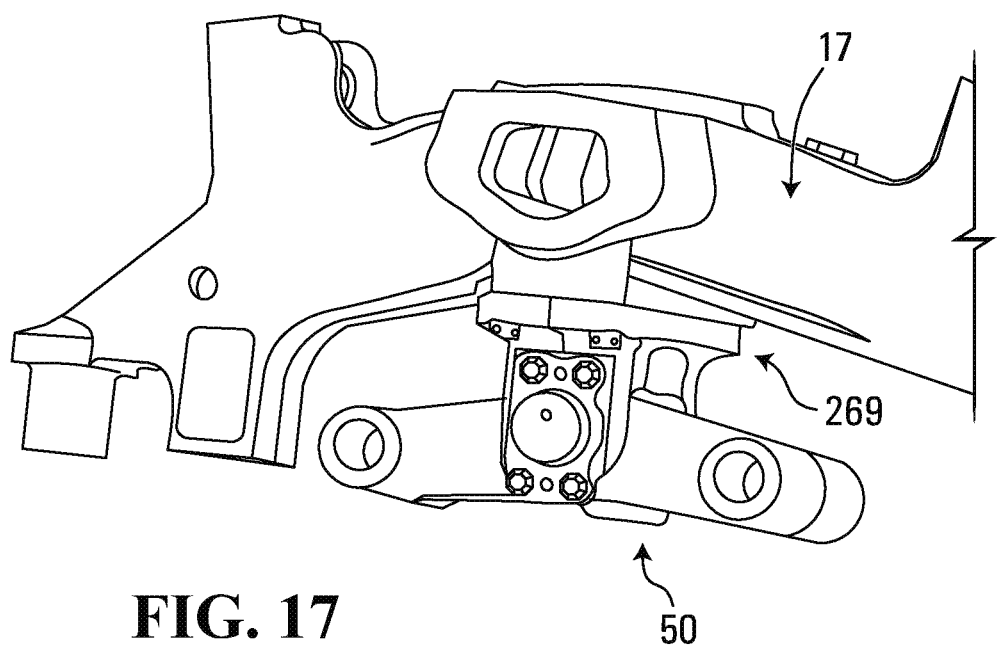
Figure 18:
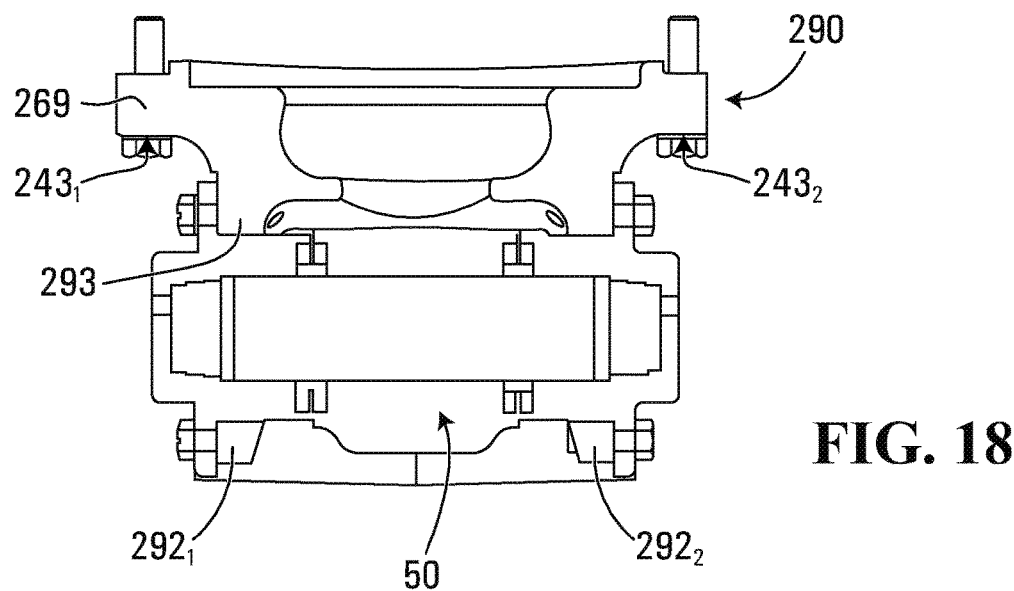
Figure 19:
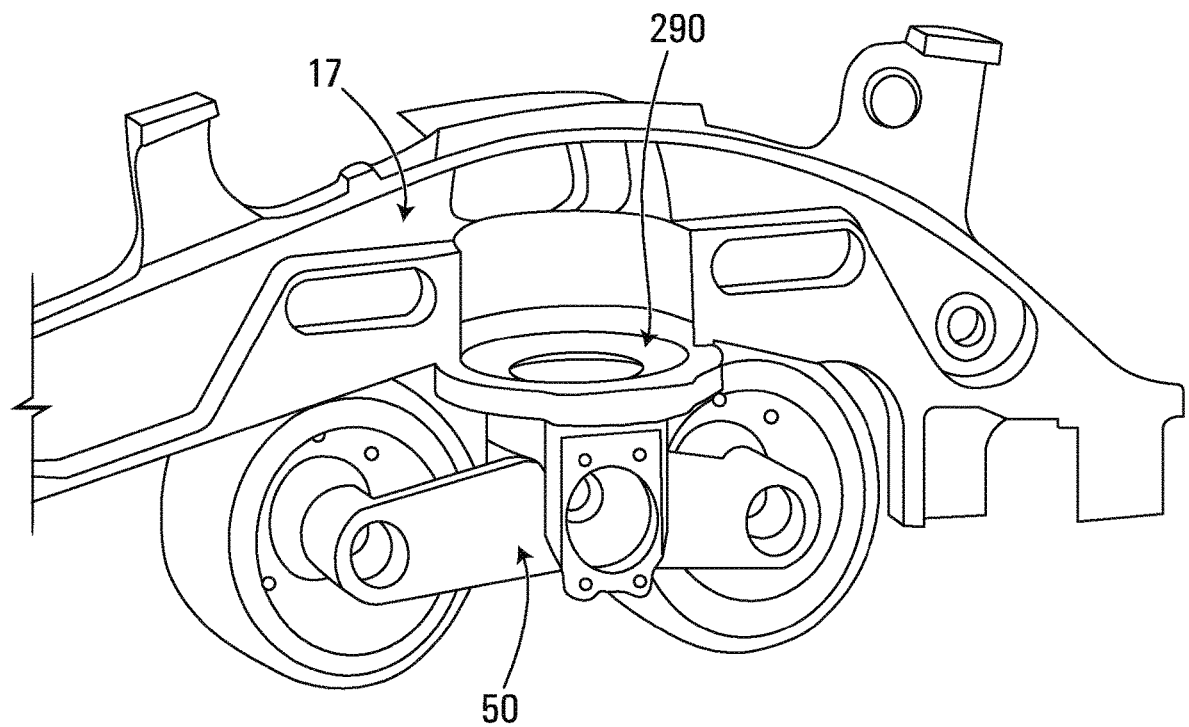

In some cases, as represented in FIG. 9E, movement of the bogie 50 relative to the frame 17 due to deformation of the spring 180 may induce a rotation of the bogie 50 about an axis of rotation R$_w$ generally parallel to the widthwise direction of the track assembly 16$_i$, which can be seen as a quasi-pivotal movement of the bogie 50 about the axis of rotation R$_w$ generally parallel to the widthwise direction of the track assembly 16$_i$. This rotation of the bogie 50 about the axis of rotation R$_w$ generally parallel to the widthwise direction of the track assembly 16$_i$ allowed by the spring 180 defines an angular displacement θ$_w$ of the bogie 50 relative to the frame 17. The angular displacement θ$_w$ of the bogie 50 can take on any suitable value. For example, in some embodiments, the angular displacement θ$_w$ of the bogie 50 may be at least 1°, in some cases at least 2°, in some cases at least 3°, and in some cases even more (e.g., 5°, 10°, 15° or more). The angular displacement θ$_w$ of the bogie 50 can take on various other values in other embodiments.

The rotation of the bogie 50 about an axis of rotation R$_w$ generally parallel to the widthwise direction of the track assembly 16$_i$ allowed by the spring 180 and the angular displacement θ$_w$ of the bogie 50 relative to the frame 17 that it defines may occur in addition to a rotation of the bogie 50 about its pivot axis 64. The rotation of the bogie 50 about its pivot axis 64 defines an angular displacement θ$_p$ of the bogie 50 relative to the frame 17. The angular displacement θ$_p$ of the bogie 50 can take on any suitable value. For example, in some embodiments, the angular displacement θ$_p$ of the bogie 50 may be at least 4°, in some cases at least 6°, in some cases at least 8°, in some cases at least 10°, and in some cases even more (e.g., 15° or more). Thus, in such embodiments, a total angular displacement θ$_{w\text{-}tot}$ of the bogie 50 relative to the frame 17 about axes parallel to the widthwise direction of the track assembly 16$_i$ corresponds to a sum of the angular displacement θ$_p$ of the bogie 50 due to pivoting of the wheel-carrying structure 63 about the pivot axis 64 and the angular displacement θ$_w$ of the bogie 50 due to compliance of the spring 180.

FIGS. 25 to 34 show a variant of the track assembly 16$_i$ according to another embodiment of the invention. In this embodiment, the track assembly 16$_i$ comprises a movement limiter 183 for limiting movement of the bogie 50 relative to the frame 17. More particularly, in this embodiment, the movement limiter 183 is a spring deformation limiter for limiting deformation of the spring 180 of the suspension 74 to limit movement of the bogie 15 due to deformation of the spring 180. This prevents the spring 180 from being over stretched or over compressed during use.

In this example of implementation, the spring deformation limiter 183 acts to limit the various degrees of freedom of movement of the bogie 50 relative to the frame 17, including a rotation of the bogie 50 relative to the frame 17 about an axis of rotation R$_l$ generally parallel to the longitudinal direction of the track assembly 16$_i$ and a rotation of the bogie 50 relative to the frame 17 about an axis of rotation R$_w$ generally parallel to the widthwise direction of the track assembly 16$_i$.

In this embodiment, the spring deformation limiter 183 comprises a plurality of movement stoppers 189$_1$-189$_3$. In this example, each of the stoppers 189$_1$-189$_3$ comprises a first stopping part, namely an abutment member 191$_1$, 191$_2$, 191$_3$, which can abut on a second stopping part, namely a part of the inner portion 187 of the housing 182 of the spring 180, to stop movement of the inner portion 187 of the housing 182. More particularly, in this example, the abutment member 191$_1$, 191$_2$, 191$_3$, of each of the stoppers 189$_1$-189$_3$ is an abutment projection that extends into an opening 195 of that stopper defined by the inner portion 187 of the housing 182. In this case, the abutment member $191_1$, $191_2$ of each of the movement stoppers $189_1$-$189_2$ is part of the outer portion 186 of the housing 182, while the abutment member $191_3$ of the movement stopper $189_3$ is part of the frame 17. The movement stoppers $189_1$-$189_3$ may be configured in any other suitable way in other embodiments.

The spring deformation limiter 183 may be implemented in various other manners in other embodiments. For example, the spring deformation limiter 183 may comprise any number of movement stoppers such as the movement stoppers $189_1$-$189_3$ in other embodiments (i.e., a single movement stopper, two movement stoppers, or more than three movement stoppers).

In this embodiment, the frame 17 comprises a forklift receiver 97 for receiving a forklift to lift the track assembly $16_i$ when it is to be transported to or from the vehicle 10 for installation or removal therefrom. More particularly, in this embodiment, the forklift receiver 97 comprises a pair of forklift-receiving openings $96_1$, $96_2$ for receiving a pair of fork members of the forklift.

In some embodiments, the track assembly $16_i$ may enable different mounting configurations for the mid-rollers $28_1$-$28_4$ using the same frame 17. For example, in various embodiments, the frame 17 may allow the mid-rollers $28_1$-$28_4$ to be mounted: (i) with the suspension 74, i.e., a "suspension" configuration, as discussed above; (ii) without the suspension 74, i.e., a "suspension-less" or "no-suspension" configuration; or without a pivotable bogie such as the bogie 50, i.e., a "bogie-less" or "hardbottom" configuration.

As an example, in some embodiments, as shown in FIGS. 16 to 19, the track assembly $16_i$ discussed above in respect of FIGS. 7 to 15 may be used without the suspension 74 such that there is no resilient device between the bogie 50 carrying the mid-rollers $28_1$-$28_4$ and the frame 17 (i.e., a "no-suspension" configuration). In this embodiment, the track assembly $16_i$ comprises a support 290 coupled to the frame 17 and to the bogie 50 to support the bogie 50. In this case, the support 290 is configured similarly to the support 190 of the resilient device 175 discussed above.

More particularly, in this case, the support 290 includes a pair of brackets $292_1$, $292_2$ which are spaced apart in the widthwise direction of the track assembly $16_i$ and configured to receive a central part of the bogie 50 through which passes the bogie's pivot axis 64. Each of the brackets $292_1$, $292_2$ includes an opening 293 to receive a portion of the bogie 50 and a plurality of holes $294_1$-$294_4$ to receive fasteners fastening the bogie 50 to the support 290. Also, in this example, the support 290 comprises a flange 269 including holes $243_1$-$243_2$ for receiving fasteners to fasten the support 290 to the frame 17 via the frame's holes $91_1$-$91_4$. The support 290 may be configured in various other ways in other embodiments.

FIGS. 35 to 38 show a variant of the track assembly $16_i$ without the suspension 74 such that there is no resilient device between the bogie 50 carrying the mid-rollers $28_1$-$28_4$ and the frame 17 (i.e., a "no-suspension" configuration), in accordance with another embodiment of the invention. In this embodiment, the track assembly $16_i$ comprises a movement limiter 283 for limiting movement of the bogie 50 relative to the frame 17. More particularly, in this embodiment, the movement limiter 283 is a pivot limiter for limiting pivoting of the bogie 50 about its pivot axis 64.

In this embodiment, the pivot limiter 283 comprises a plurality of movement stoppers $289_1$, $289_2$. In this example, each of the stoppers $289_1$, $289_2$ comprises a pair of stopping parts, namely abutment member $291_1$, $291_2$, which can abut one another to stop pivoting of the bogie 50 about its pivot axis 64. More particularly, in this example, each of the abutment members $291_1$, $291_2$ of each of the stoppers $289_1$, $289_2$ is an abutment projection. In this case, the abutment member $291_1$ of each of the movement stoppers $289_1$, $289_2$ is part of the bogie 50, while the abutment member $291_2$ of each of the movement stoppers $289_1$, $289_2$ is part of the frame 17 (as can also be seen in FIG. 30). The movement stoppers $289_1$, $289_2$ may be configured in any other suitable way in other embodiments.

The pivot limiter 283 may be implemented in various other manners in other embodiments. For example, the pivot limiter 283 may comprise any number of movement stoppers such as the movement stoppers $289_1$, $289_2$ in other embodiments (i.e., a single movement stopper, or more than two movement stoppers).

Figure 20:
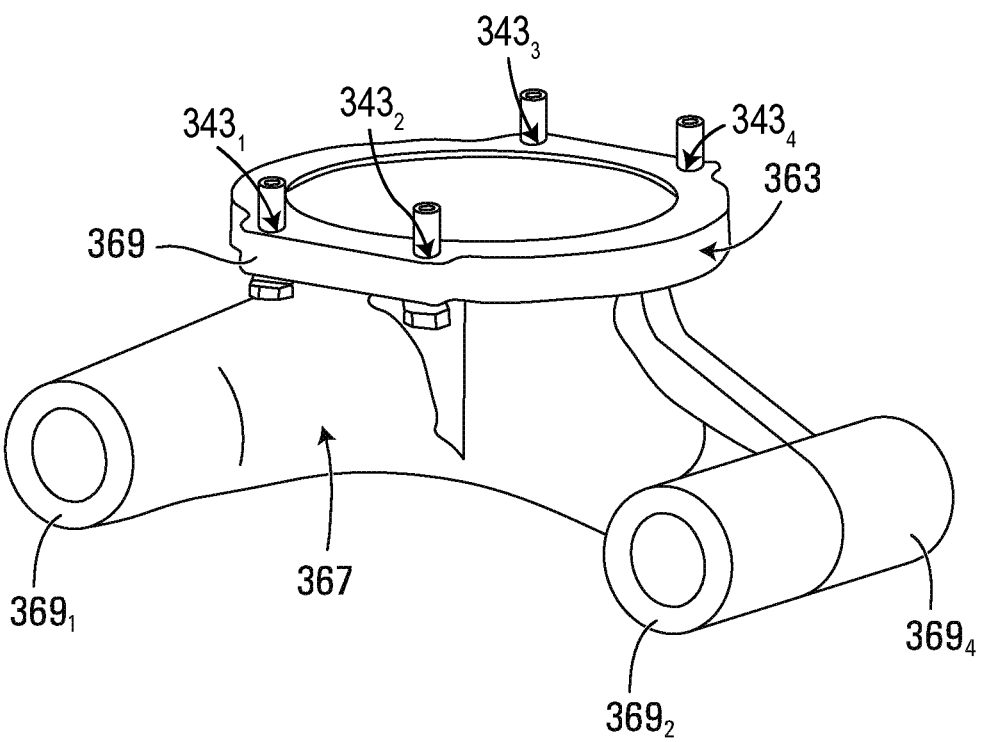
FIGS. 20 to 22 show another variant of the track assembly in which there is no bogie pivotable relative to the frame.
Figure 21:
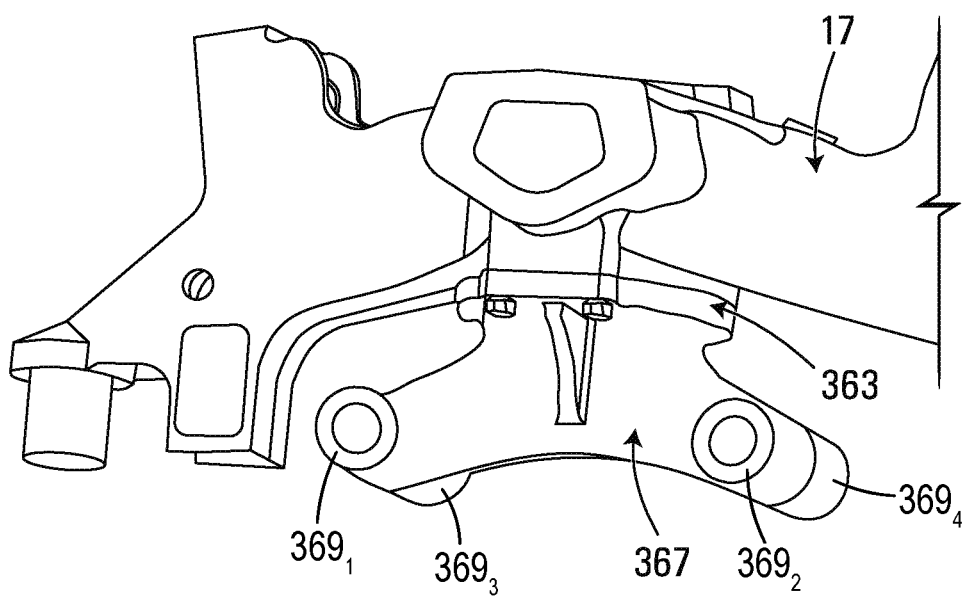
Figure 22:
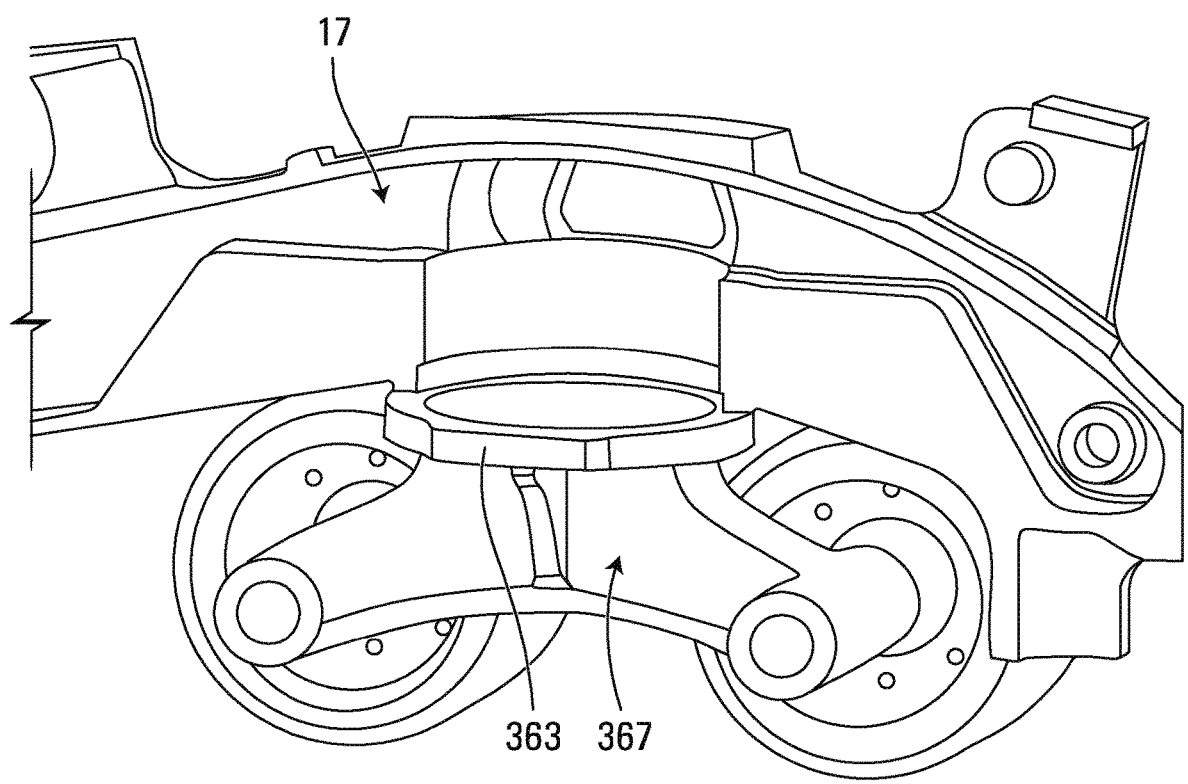

As another example, in some embodiments, as shown in FIGS. 20 to 22, the track assembly $16_i$ discussed above in respect of FIGS. 7 to 15 may be used without a pivotable bogie carrying the mid-rollers $28_1$-$28_4$ such as the bogie 50 such that the mid-rollers $28_1$-$28_4$ are rigidly mounted to the frame 17 (i.e., a "hardbottom" configuration). In this embodiment, a wheel-carrying structure 363 carrying the mid-rollers $28_1$-$28_4$ is rigidly secured to the frame 17.

More particularly, in this embodiment, the wheel-carrying structure 363 comprises an elongated portion 367 extending in the longitudinal direction of the track assembly $16_i$ and wheel mounts $369_1$-$369_4$ supporting respective axles of the mid-rollers $28_1$-$28_4$. The wheel-carrying structure 363 also comprises a flange 369 including holes $343_1$-$343_4$ for receiving fasteners to fasten the wheel-carrying structure 363 to the frame 17 via the frame's holes $91_1$-$91_4$. The wheel-carrying structure 363 may be configured in various other ways in other examples of implementation The flexibility in how the mid-rollers $28_1$-$28_4$ are mountable to the frame 17 may be useful to better fit the track assembly $16_i$ to the needs of a manufacturer or user of the agricultural vehicle 10 and/or to the application in which the vehicle 10 is used.

For example, in some embodiments, on a four-track vehicle such as the agricultural vehicle 10 considered above, the mid-rollers $28_1$-$28_4$ of the track assembly $16_1$ in a front of the vehicle 10 may be mounted to the frame 17 of the track assembly $16_1$ in a manner different than that in which the mid-rollers $28_1$-$28_4$ of the track assembly $16_3$ in a rear of the vehicle 10 are mounted to the frame 17 of the track assembly $16_3$, yet the frame 17 of these two track assemblies may be substantially identical. For instance, in some cases, the track assembly $16_1$ in the front of the vehicle 10 may have the "suspension" configuration (i.e., include the suspension 74) as discussed in respect of FIGS. 7 to 15, while the track assembly $16_3$ in the rear of the vehicle 10 may have the "no-suspension" configuration (i.e., not include the suspension 74) as discussed in respect of FIGS. 16 to 19 or the "hardbottom" configuration (i.e., not include the pivotable bogie 50) as discussed in respect of FIGS. 20 to 22. For example, such an arrangement may be employed if, because of the position of the operator cabin 20 and the operator's seat on the agricultural vehicle 10, a majority of the ride quality benefit may be achieved by using the "suspension" configuration only in the front track assemblies $16_1$-$16_2$ that are connected to the front axle 32 of the vehicle 10. Also, in some cases, the front or rear axle 32 of the vehicle 10 may have an axle suspension and this can determine where the "suspension" configuration for the track assembly $16_i$ would be used. Various other combinations of the "suspension"

configuration, "no-suspension" configuration, and the "hardbottom" configuration may be used in other cases.

As another example, in some embodiments, use of the "suspension" configuration, the "no-suspension" configuration, or the "hardbottom" configuration in a track assembly $16_i$ may be based on a preference of the manufacturer or user of the agricultural vehicle 10. For instance, the track assembly $16_i$ may be standardly offered with the "no-suspension" configuration or the "hardbottom" configuration, but optionally upgradable to the "suspension" configuration by adding the suspension 74.

While in this embodiment the track assemblies $16_1$-$16_4$ are configured in a certain way, the track assemblies $16_1$-$16_4$ may be configured in various other ways in other embodiments.

For example, in other embodiments, the track assembly $16_i$ may comprise more or less mid-rollers such as the mid-rollers $28_1$-$28_4$. For instance, in some cases, the track assembly $16_i$ may comprise additional mid-rollers, possibly arranged in one or more additional tandems. In other cases, the track assembly $16_i$ may not comprise any tandem.

As another example, the endless track 22 may be constructed in various other ways and/or using various other materials in other embodiments. Also, while in this embodiment the endless track 22 is a one-piece jointless track, in other embodiments, the endless track 22 may be a "segmented" track comprising a plurality of track sections interconnected to one another at a plurality of joints. In other embodiments, the endless track 22 may be a one-piece track that can be closed like a belt with connectors at both of its longitudinal ends to form a joint.

As yet another example, in other embodiments, instead of having the drive wheel 24 mounted to the axle 32 of the agricultural vehicle 10, the track assembly $16_i$ may comprise a transmission between the axle 32 of the agricultural vehicle 10 and the drive wheel 24 to transmit power from the axle 32 to the drive wheel 24 and perform a speed conversion such that the drive wheel 24 rotates at a rotational speed different from a rotational speed of the axle 32.

Although in embodiments considered above the track assemblies $16_1$-$16_4$ are provided both in the front and the rear of the agricultural vehicle 10, in other embodiments, the track assemblies $16_1$, $16_2$ or the track assemblies $16_3$, $16_3$ may be replaced by ground-engaging wheels such as the ground-engaging wheels $15_1$-$15_8$ discussed above in respect of FIG. 23. For instance, in some embodiments, the agricultural vehicle 10 may be propelled by the track assemblies $16_1$, $16_2$ in the front and by ground-engaging wheels such as the ground-engaging wheels $15_1$-$15_8$ in the rear.

While in embodiments considered above the agricultural vehicle 10 has two track assemblies on each of its lateral sides, in other embodiments, the vehicle 10 may have a single track assembly on each lateral side. In such embodiments, this track assembly may be elongated in the longitudinal direction of the vehicle 10 such that it extends from the front to the rear of the vehicle 10 and may have a drive wheel located at longitudinal end of the track assembly (as opposed to between the front idler wheels $23_1$, $23_2$ and the rear idler wheels $26_1$, 26 in the track assembly $16_i$ discussed above) and an idler wheel at an opposite longitudinal end of the track assembly.

Although in embodiments considered above the off-road vehicle 10 is an agricultural vehicle for performing agricultural work, in other embodiments, the vehicle 10 may be a construction vehicle (e.g., a loader, a bulldozer, an excavator, etc.) for performing construction work, a forestry vehicle (e.g., a feller-buncher, a tree chipper, a knuckleboom loader, etc.) for performing forestry work, a military vehicle (e.g., a combat engineering vehicle (CEV), etc.) for performing work in a military application, a transporter vehicle (e.g., a heavy hauler, a flatbed truck, a trailer, a carrier, etc.) for transporting equipment, materials, cargo or other objects, or any other vehicle operable off paved roads. Although operable off paved roads, the vehicle 10 may also be operable on paved roads in some cases. Also, while in embodiments considered above the vehicle 10 is driven by a human operator in the vehicle 10, in other embodiments, the vehicle 10 may be an unmanned ground vehicle (e.g., a teleoperated or autonomous unmanned ground vehicle).

Any feature of any embodiment discussed herein may be combined with any feature of any other embodiment discussed herein in some examples of implementation.

While various embodiments and examples have been presented, this was for the purpose of describing, but not limiting, the invention. Various modifications and enhancements will become apparent to those of ordinary skill in the art and are within the scope of the invention, which is defined by the appended claims.

The invention claimed is:

1. A track assembly for providing traction to an off-road vehicle, the track assembly having a longitudinal direction, a widthwise direction, and a height direction, the track assembly comprising:
   a) a frame;
   b) a plurality of track-contacting wheels including:
      i. a drive wheel; and
      ii. a plurality of roller wheels;
   c) an endless track disposed around the track-contacting wheels, the endless track comprising an inner side facing the track-contacting wheels and a ground-engaging outer side for engaging the ground, the drive wheel engaging the endless track to drive the endless track, the roller wheels being disposed to roll on a bottom run of the endless track;
   d) a bogie carrying at least two of the roller wheels; and
   e) a resilient device mounted between the frame and the bogie for allowing the bogie to move relative to the frame when the track assembly travels on an uneven ground area, the resilient device comprising a spring, the spring allowing movement of the bogie relative to the frame in the height direction of the track assembly and allowing movement of the bogie relative to the frame in a direction transversal to the height direction of the track assembly.

2. A track assembly for a vehicle, the track assembly comprising:
   a track that is elastomeric and comprises a ground-engaging outer side;
   a plurality of track-contacting wheels for driving and guiding the track around the track-contacting wheels, the track-contacting wheels including:
   a drive wheel for driving the track; and
   a plurality of roller wheels for rolling on a lower run of the track;
   a frame supporting the roller wheels; and
   a resilient portion between the frame and the roller wheels and resiliently deformable to allow movement of the roller wheels relative to the frame;
   wherein: each of the roller wheels is rotatable about an axis of rotation transverse to a widthwise direction of the track assembly; and longitudinally-spaced ones of the roller wheels that are spaced from one another in a longitudinal direction of the track assembly are movable relative to one another in a heightwise direction of the track assembly.

3. The track assembly of claim 2, wherein the axis of rotation transverse to the widthwise direction of the track assembly is generally parallel to the longitudinal direction of the track assembly.

4. The track assembly of claim 2, wherein at least part of the resilient portion is below and within a span of the drive wheel in the longitudinal direction of the track assembly.

5. The track assembly of claim 2, wherein the resilient portion comprises: a housing between the frame and the roller wheels; and resilient material disposed within the housing.

6. The track assembly of claim 5, wherein the resilient material is elastomeric material.

7. The track assembly of claim 5, wherein the housing comprises an outer member fastened to the frame via fasteners.

8. The track assembly of claim 2, wherein the resilient portion comprises a single resilient member resiliently deformable to cause rotation of all the roller wheels about the axis of rotation transverse to the widthwise direction of the track assembly.

9. The track assembly of claim 2, wherein the resilient portion comprises a plurality of resilient members spaced from one another.

10. The track assembly of claim 2, wherein the frame comprises a cavity open towards a bottom of the frame and receiving at least part of the resilient portion.

11. The track assembly of claim 2, wherein the resilient portion comprises an elastomeric member.

12. The track assembly of claim 11, wherein a longitudinal axis of the elastomeric member is transverse to axles of the roller wheels.

13. The track assembly of claim 12, wherein the longitudinal axis of the elastomeric member is generally parallel to the heightwise direction of the track assembly.

14. The track assembly of claim 11, wherein the elastomeric member is tapered.

15. The track assembly of claim 11, wherein: the resilient portion comprises a housing; and the elastomeric member is secured to the housing.

16. The track assembly of claim 15, wherein: the housing comprises an outer member and an inner member; and the elastomeric member is disposed between the outer member and the inner member of the housing.

17. The track assembly of claim 2, wherein: the track-contacting wheels include a leading idler wheel and a trailing idler wheel spaced from one another in the longitudinal direction of the track assembly; and the roller wheels are disposed between the leading idler wheel and the trailing idler wheel in the longitudinal direction of the track assembly.

18. The track assembly of claim 2, wherein the longitudinally-spaced ones of the roller wheels are movable relative to one another in the heightwise direction of the track assembly by being rotatable about an axis of rotation transverse to the longitudinal direction of the track assembly.

19. The track assembly of claim 18, wherein the axis of rotation transverse to the longitudinal direction of the track assembly is generally parallel to the widthwise direction of the track assembly.

20. The track assembly of claim 19, wherein at least one of the longitudinally-spaced ones of the roller wheels is located below and within a span of the drive wheel in the longitudinal direction of the track assembly.

21. The track assembly of claim 2, wherein the track comprises an inner side opposite to the ground-engaging outer side and comprising a plurality of wheel-contacting projections that are disposed to pass between respective ones of the roller wheels in the widthwise direction of the track.

22. A track assembly for a vehicle, the track assembly comprising:
a track that is elastomeric and comprises a ground-engaging outer side;
a plurality of track-contacting wheels for driving and guiding the track around the track-contacting wheels, the track-contacting wheels including:
a drive wheel for driving the track; and
a plurality of roller wheels for rolling on a lower run of the track;
a frame supporting the roller wheels; and
a resilient portion between the frame and the roller wheels and resiliently deformable to allow movement of the roller wheels relative to the frame, the resilient portion comprising:
a housing between the frame and the roller wheels; and
resilient material disposed within the housing;
wherein each of the roller wheels is rotatable about an axis of rotation transverse to a widthwise direction of the track assembly.

23. The track assembly of claim 22, wherein the axis of rotation transverse to the widthwise direction of the track assembly is generally parallel to a longitudinal direction of the track assembly.

24. The track assembly of claim 22, wherein at least part of the resilient portion is below and within a span of the drive wheel in a longitudinal direction of the track assembly.

25. The track assembly of claim 22, wherein longitudinally-spaced ones of the roller wheels that are spaced from one another in a longitudinal direction of the track assembly are movable relative to one another in a heightwise direction of the track assembly.

26. The track assembly of claim 22, wherein the resilient material is elastomeric material.

27. The track assembly of claim 22, wherein the housing comprises an outer member fastened to the frame via fasteners.

28. The track assembly of claim 22, wherein the resilient portion comprises a single resilient member resiliently deformable to cause rotation of all the roller wheels about the axis of rotation transverse to the widthwise direction of the track assembly.

29. The track assembly of claim 22, wherein the resilient portion comprises a plurality of resilient members spaced from one another.

30. The track assembly of claim 22, wherein the frame comprises a cavity open towards a bottom of the frame and receiving at least part of the resilient portion.

31. The track assembly of claim 22, wherein the resilient portion comprises an elastomeric member.

32. The track assembly of claim 31, wherein a longitudinal axis of the elastomeric member is transverse to axles of the roller wheels.

33. The track assembly of claim 32, wherein the longitudinal axis of the elastomeric member is generally parallel to a heightwise direction of the track assembly.

34. The track assembly of claim 31, wherein the elastomeric member is tapered.

35. The track assembly of claim 22, wherein: the housing comprises an outer member and an inner member; and the resilient material is disposed between the outer member and the inner member of the housing.

36. The track assembly of claim 22, wherein: the track-contacting wheels include a leading idler wheel and a trailing idler wheel spaced from one another in the longitudinal direction of the track assembly; and the roller wheels are disposed between the leading idler wheel and the trailing idler wheel in a longitudinal direction of the track assembly.

37. The track assembly of claim 22, wherein the track comprises an inner side opposite to the ground-engaging outer side and comprising a plurality of wheel-contacting projections that are disposed to pass between respective ones of the rollers wheels in the widthwise direction of the track.

38. A track assembly for a vehicle, the track assembly comprising:
- a track that is elastomeric and comprises a ground-engaging outer side;
- a plurality of track-contacting wheels for driving and guiding the track around the track-contacting wheels, the track-contacting wheels including:
- a drive wheel for driving the track; and
- a plurality of roller wheels for rolling on a lower run of the track;
- a frame supporting the roller wheels; and
- a resilient portion between the frame and the roller wheels and resiliently deformable to allow movement of the roller wheels relative to the frame, the resilient portion comprising an elastomeric member, a longitudinal axis of the elastomeric member being transverse to axles of the roller wheels;
- wherein each of the roller wheels is rotatable about an axis of rotation transverse to a widthwise direction of the track assembly.

* * * * *